(12) United States Patent
Wansa et al.

(10) Patent No.: US 11,727,800 B2
(45) Date of Patent: Aug. 15, 2023

(54) SYSTEM AND METHOD FOR LAW ENFORCEMENT INCIDENT REPORTING

(71) Applicant: Mark43, Inc., New York, NY (US)

(72) Inventors: Clint C. Wansa, La Jolla, CA (US); James M. Friedman, Ormond Beach, FL (US)

(73) Assignee: Mark43, Inc., New York, NY (US)

( * ) Notice: Subject to any disclaimer, the term of this patent is extended or adjusted under 35 U.S.C. 154(b) by 632 days.

(21) Appl. No.: 16/703,005

(22) Filed: Dec. 4, 2019

(65) Prior Publication Data

US 2020/0175861 A1 Jun. 4, 2020

Related U.S. Application Data

(60) Provisional application No. 62/775,133, filed on Dec. 4, 2018.

(51) Int. Cl.
*G08G 1/0965* (2006.01)
*G08G 1/00* (2006.01)
(Continued)

(52) U.S. Cl.
CPC ......... *G08G 1/0965* (2013.01); *G06F 16/901* (2019.01); *G06F 16/9035* (2019.01);
(Continued)

(58) Field of Classification Search
CPC ....... G08G 1/0965; G08G 1/202; H04W 4/40; G06F 16/901; G06F 16/9038; G06F 16/9035; G06Q 50/26
(Continued)

(56) References Cited

U.S. PATENT DOCUMENTS

| 4,817,166 A | * | 3/1989 | Gonzalez | G06V 20/63 |
| | | | | 382/105 |
| 5,835,376 A | * | 11/1998 | Smith | G06Q 30/0284 |
| | | | | 701/117 |

(Continued)

*Primary Examiner* — Zhen Y Wu
(74) *Attorney, Agent, or Firm* — Perkins Coie LLP

(57) ABSTRACT

The present application is directed to a system and method for law enforcement incident reporting. More particularly, a mobile application is provided with multiple modules related to the law enforcement incident reporting procedures for vehicle-vehicle, vehicle-pedestrian, and vehicle-property collisions. The system and method of the present application can be used by law enforcement (LE) patrol officers to accurately and quickly document LE incidents and traffic collision reports in a fraction of time compared to the traditional reporting styles of using pen and paper. The system and method of the present application is primarily used as a mobile application and is compatible with both Android and iOS devices including smartphones, tablets, desktops, laptops, hand-held computers, etc. Once incidents/collisions are documented, LE officers can edit, store and send their respective reports. Prominent features of the system's application modules include driver license scanning and information capture, vehicle information capture, digital incident/collision diagram re-creation and the use of dynamic questions throughout the application to collect relevant data regarding the incident/collision, generating a report narrative and complete incident/collision report, as well as making the report data available through a cloud based law enforcement incident report database server system.

21 Claims, 18 Drawing Sheets

(51) Int. Cl.
*G06F 16/9035* (2019.01)
*G06F 16/9038* (2019.01)
*H04W 4/40* (2018.01)
*G06F 16/901* (2019.01)
*G06Q 50/26* (2012.01)

(52) U.S. Cl.
CPC ......... G06F 16/9038 (2019.01); G08G 1/202 (2013.01); H04W 4/40 (2018.02); *G06Q 50/26* (2013.01)

(58) Field of Classification Search
USPC ........................................................ 701/31.4
See application file for complete search history.

(56) References Cited

U.S. PATENT DOCUMENTS

| | | | | |
|---|---|---|---|---|
| 8,549,028 | B1 * | 10/2013 | Alon ................... | G06F 16/9537 |
| | | | | 707/769 |
| 9,047,768 | B1 * | 6/2015 | Rapp ..................... | G08G 1/205 |
| 9,619,844 | B2 * | 4/2017 | Al-Harthi .............. | G06Q 50/01 |
| 9,916,755 | B1 * | 3/2018 | Ratti .................... | G08G 1/0112 |
| 10,685,414 | B1 * | 6/2020 | Leise ................... | G06Q 50/265 |
| 10,699,347 | B1 * | 6/2020 | Slusar ................ | G01C 21/3461 |
| 2004/0111301 | A1 * | 6/2004 | Wahlbin ................ | G06Q 40/08 |
| | | | | 705/4 |
| 2006/0015254 | A1 * | 1/2006 | Smith ..................... | H04W 4/02 |
| | | | | 340/905 |
| 2012/0116819 | A1 * | 5/2012 | Hertenstein ........... | G06Q 10/10 |
| | | | | 705/4 |
| 2013/0232427 | A1 * | 9/2013 | Romero ................. | G06Q 50/26 |
| | | | | 715/753 |
| 2013/0246041 | A1 * | 9/2013 | Costa .................... | G06F 40/58 |
| | | | | 704/2 |
| 2015/0066368 | A1 * | 3/2015 | Mckenzie .......... | G01C 21/3626 |
| | | | | 701/538 |
| 2015/0127570 | A1 * | 5/2015 | Doughty ............. | G06Q 50/265 |
| | | | | 705/325 |
| 2015/0294431 | A1 * | 10/2015 | Fiorucci ................ | G07B 15/02 |
| | | | | 705/13 |
| 2015/0317368 | A1 * | 11/2015 | Rhoads ................. | G06F 16/248 |
| | | | | 705/311 |
| 2016/0104113 | A1 * | 4/2016 | Gorlin .............. | G06Q 10/08355 |
| | | | | 705/338 |
| 2016/0323718 | A1 * | 11/2016 | Dawson ................... | G09B 7/06 |
| 2016/0358297 | A1 * | 12/2016 | Alon .................... | G06F 16/252 |
| 2017/0010118 | A1 * | 1/2017 | Hajj .................... | G01C 21/3694 |
| 2017/0116856 | A1 * | 4/2017 | Muto ...................... | G08G 1/137 |
| 2017/0132735 | A1 * | 5/2017 | Smair ................ | G06Q 10/0635 |
| 2018/0061151 | A1 * | 3/2018 | Chainer ................. | H04W 4/40 |
| 2018/0102051 | A1 * | 4/2018 | Suthar ..................... | G08G 1/04 |

* cited by examiner

FIG. 38

SYSTEM AND METHOD FOR LAW ENFORCEMENT INCIDENT REPORTING

FIELD OF THE INVENTION

This application relates to a system and method for law enforcement incident reporting. More particularly, a mobile application is provided with multiple modules related to the law enforcement incident reporting procedures for vehicle-vehicle, vehicle-pedestrian, and vehicle-property collisions. The system and method of the present application can be used by law enforcement (LE) patrol officers to accurately and quickly document LE incidents and traffic collision reports in a fraction of time compared to the traditional reporting styles of using pen and paper. The system and method of the present application is primarily used as a mobile application and is compatible with both Android and iOS devices including smartphones, tablets, desktops, laptops, hand-held computers, etc. Once incidents/collisions are documented, LE officers can edit, store and send their respective reports. Prominent features of the system's application modules include driver license scanning and information capture, vehicle information capture, digital incident/collision diagram re-creation and the use of dynamic questions throughout the application to collect relevant data regarding the incident/collision, generating a report narrative and complete incident/collision report, as well as making the report data available through a cloud based law enforcement incident report database server system.

BACKGROUND OF THE INVENTION

Law enforcement technology has been severely out of date and antiquated for many years, especially the way in which traffic collisions are reported and documented in the state of California. All law enforcement agencies in the state of California need to meet certain State Wide Integrated Traffic Reporting System (SWITRS) requirements in order to comply with the proper documentation of these traffic collisions. Most law enforcement agencies in the state of California use paper documentation or a "type over PDF format" style to document these collisions. SWITRS and the state of California do not accept paper documentation which makes traditional reporting methods by pen and paper antiquated and redundant as these collisions are manually re-typed into a database where the collisions are re-stored. This type of paper documentation leads to officers spending a large amount of time handwriting traffic reports including physically having to hand draw diagrams of where collisions occurred. Handwriting traffic reports leads to illegible handwriting, loss of reports due to "paper trails" and lack of options of being able to edit, store and send completed reports. The system and method of the present application meets the SWITRS requirements and greatly reduces the amount of time patrol officers spend documenting traffic collisions. Alpha testing done by a sample size of 50 San Diego Police Officers showed a 75% reduction in the amount of time spent documenting collisions compared to traditional reporting methods.

To date there have been no examples of using a web-based application to complete law enforcement traffic collision reports in a timely manner. There has also been no attempt at using a web-based application to store (in a cloud database server system interface) these traffic collision reports.

In this respect, before explaining at least one embodiment of the System and Method for Law Enforcement Incident Reporting in greater detail, it is to be understood that the design is not limited in its application to the details of construction and to the arrangement of the components set forth in the following description or illustrated in the drawings. The System and Method for Law Enforcement Incident Reporting is capable of other embodiments and of being practiced and carried out in various ways. Also, it is to be understood that the phraseology and terminology employed herein are for the purpose of description and should not be regarded as limiting.

SUMMARY OF THE INVENTION

The preferred embodiment of the System and Method for Law Enforcement Incident Reporting comprises computer application and/or mobile application software for use on smartphones, computers, desktops, laptops, tablets and mobile devices for the reporting of law enforcement incidents utilizing a web-based program to generate incident reports and upload incident reports, as well as incident report data, to a cloud based law enforcement incident report database server system and make the incident reports and incident report data available to law enforcement officers, police departments, judicial institutions, governmental agencies and private parties, attorneys and interested individuals.

The primary advantage of the System and Method for Law Enforcement Incident Reporting is that it is mobile based, can be used by law enforcement personnel to rapidly gather incident/collision report data and readily generate an incident/collision report.

Another advantage of the System and Method for Law Enforcement Incident Reporting is that it can be used by law enforcement personnel to rapidly gather incident/collision report data, readily generate an incident/collision report, then disseminate that report to multiple interested parties.

Yet another advantage of the System and Method for Law Enforcement Incident Reporting is that it can be used by law enforcement personnel to rapidly gather incident/collision report data and share that incident/collision report data to other officers in at the scene of the incident/collision.

A further advantage of the System and Method for Law Enforcement Incident Reporting is that it can be used by law enforcement personnel to rapidly gather incident/collision report data, readily generate an incident/collision report, then upload the generated report to a cloud-based law enforcement incident report database server system.

Another advantage of the System and Method for Law Enforcement Incident Reporting is that it can be used by law enforcement personnel to rapidly gather complete, extensive, relevant and appropriate incident/collision report data in a structured guided mobile application method.

Yet another advantage of the System and Method for Law Enforcement Incident Reporting is that it can be used by law enforcement personnel to rapidly gather complete, extensive, relevant and appropriate incident/collision report data on incident/collision involved people in a structured guided mobile application method.

A further advantage of the System and Method for Law Enforcement Incident Reporting is that it can be used by law enforcement personnel to rapidly gather complete, extensive, relevant and appropriate incident/collision report data on incident/collision involved vehicles in a structured guided mobile application method.

Another advantage of the System and Method for Law Enforcement Incident Reporting is that it can be used by law enforcement personnel to rapidly gather complete, extensive, relevant and appropriate incident/collision report data on incident/collision crash diagrams surrounding an incident/collision in a structured guided mobile application method.

Yet another advantage of the System and Method for Law Enforcement Incident Reporting is that it can be used by law enforcement personnel to rapidly gather complete, extensive, relevant and appropriate incident/collision report data on incident/collision party factors surrounding an incident/collision in a structured guided mobile application method.

A further advantage of the System and Method for Law Enforcement Incident Reporting is that it can be used by law enforcement personnel to rapidly gather complete, extensive, relevant and appropriate incident/collision report data on incident/collision media surrounding an incident/collision in a structured guided mobile application method.

Another advantage of the System and Method for Law Enforcement Incident Reporting is that it can be used by law enforcement personnel to rapidly gather complete, extensive, relevant and appropriate incident/collision report data on incident/collision crash details surrounding an incident/collision in a structured guided mobile application method.

Another advantage of the System and Method for Law Enforcement Incident Reporting is that it can be used by law enforcement personnel to rapidly gather complete, extensive, relevant and appropriate incident/collision report data to be used to readily generate report narratives describing an incident/collision for reporting an incident/collision in a structured guided mobile application reporting method.

Another advantage of the System and Method for Law Enforcement Incident Reporting is that it can be used by law enforcement personnel to rapidly gather complete, extensive, relevant and appropriate incident/collision report data on incident/collisions to generate complete comprehensive reports describing an incident/collision in a structured guided mobile application reporting method.

Another advantage of the System and Method for Law Enforcement Incident Reporting is that it can be used by law enforcement personnel to rapidly capture driver license information.

Another advantage of the System and Method for Law Enforcement Incident Reporting is that it can be used by law enforcement personnel to rapidly capture vehicle information.

Another advantage of the System and Method for Law Enforcement Incident Reporting is that it can be used by law enforcement personnel to rapidly capture insurance information.

Another advantage of the System and Method for Law Enforcement Incident Reporting is that reports uploaded to the cloud-based law enforcement incident report database server system can be disseminated wirelessly to officers on the scene of an incident, governmental agencies and private parties who wish copies of a report, or who are doing research into the statistics and demographics of law enforcement incidents.

These together with other advantages of the System and Method for Law Enforcement Incident Reporting, along with the various features of novelty, which characterize the design are pointed out with particularity in the claims annexed to and forming a part of this disclosure. For a better understanding of the System and Method for Law Enforcement Incident Reporting its operating advantages and the specific objects attained by its uses, reference should be made to the accompanying drawings and descriptive matter in which there are illustrated the preferred and alternate embodiments of the System and Method for Law Enforcement Incident Reporting. There has thus been outlined, rather broadly, the more important features of the design in order that the detailed description thereof that follows may be better understood, and in order that the present contribution to the art may be better appreciated. There are additional features of the System and Method for Law Enforcement Incident Reporting that will be described hereinafter, and which will form the subject matter of the claims appended hereto.

The preferred embodiment of the System and Method for Law Enforcement Incident Reporting will be configured as a mobile application with multiple modules related to the law enforcement incident reporting procedures for all types of law enforcement incidents, but especially vehicle-vehicle, vehicle-pedestrian, and vehicle-property collisions. The system and method of the present application can be used by law enforcement (LE) patrol officers to accurately and quickly document LE incidents and traffic collision reports in a fraction of time compared to the traditional reporting styles of using pen and paper. The system and method of the present application is primarily used as a mobile application and is compatible with both Android and iOS devices including smartphones, tablets, desktops, laptops, hand-held computers, etc. Once incidents/collisions are documented, LE officers can edit, store and send their respective reports. Prominent features of the system's application modules include driver license scanning and information capture, vehicle information capture, digital incident/collision diagram re-creation and the use of dynamic questions throughout the application to collect relevant data regarding the incident/collision, generating a report narrative and complete incident/collision report, as well as making the report data available through a cloud based law enforcement incident report database server system.

In alternate embodiments of the System and Method for Law Enforcement Incident Reporting various and numerous other modules related to other law enforcement incidents can be added to the system, or can be customized for varying incidents which LE officers encounter. The System and Method for Law Enforcement Incident Reporting provided can also be used to disseminate completed reports to police departments, the court system, governmental agencies, private individuals, attorneys and private organizations wishing to access the reports. Officers at the incident scene will be capable of sharing working reports as well as completed reports or parts of a report, such as license captured or media captured by one of the officers. Completed reports will be uploaded to a cloud based law enforcement incident report database server system to be indexed, cataloged and made accessible to interested parties. Incident reports uploaded to the cloud-based law enforcement incident report database server system can be disseminated wirelessly to officers on the scene of an incident, governmental agencies and private parties who wish copies of a report, or who are doing research into the statistics and demographics of law enforcement incidents.

The System and Method for Law Enforcement Incident Reporting secondary and optional features will include the following design and operational features:
- Automatically capture video and photos from drone or throwable Camera;
- Auto Generate diagram from overhead video and photo capture;
- Capture scene with 3D camera;
- Download collision information and media from onboard car computer or cloud based system;
- Capture party information directly from each parties device;

Share party information direct to devices or via cloud share;
Print party information on site and hand it out;
Automatically alert insurance companies of incident;
Capture measurements using GPS coordinates and augmented reality (AR) to detail crash heuristics;
Alert department of safety about a verified accident;
Aggregate information from surrounding systems including traffic cams, road sensors, or any other system of record;
Recreate crash in 3D, allowing playback with physics simulation;
Identify vehicle based on photo and load all relevant information via cloud;
AI Voice controlled incident capture, where officer narrates the general details, and it fills in as much of the report as possible;
3D vehicle scan from phone, detailing damage and reconstructing a 3d model;
Entire crash report captured by automated drone;
Information sharing through cloud to agency, municipal court services, state agencies, insurance companies, and national agencies; and
Gather live satellite telemetry and video footage to add to the incident details.

With respect to the above description then, it is to be realized that the optimum dimensional relationships for the parts of the System and Method for Law Enforcement Incident Reporting, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present design. Therefore, the foregoing is considered as illustrative only of the principles of the System and Method for Law Enforcement Incident Reporting. Further, since numerous modifications and changes will readily occur to those skilled in the art, it is not desired to limit the System and Method for Law Enforcement Incident Reporting to the exact construction and operation shown and described, and accordingly, all suitable modifications and equivalents may be resorted to falling within the scope of this application.

The Quick Crash application is used by law enforcement patrol officers to accurately and quickly document traffic collision reports in a fraction amount of time compared to the traditional reporting styles of using pen and paper. The Quick Crash application is primarily used as a mobile application and is compatible with both Android and iOS devices including cellphones, tablets, desktops, etc. Once collisions are documented, officers can edit, store and send their respective report(s). Features of the application include license scanning, digital diagram re-creation and the use of dynamic questions throughout the application.

Alpha testing by 50 San Diego Police Officers showed 75% efficiency in officers who used the Quick Crash mobile application. Traditional reporting methods would result in officers spending 2 hours or more documenting collisions. By using the Quick Crash mobile application, officers spend averages between 20 and 25 minutes documenting their respective investigated collisions. Officers are also able to safely store their crash(es) using a cloud infrastructure which allows for a reduction in missing reports often associated with the traditional style of pen and paper reporting.

BRIEF DESCRIPTION OF THE DRAWINGS

The accompanying drawings, which are incorporated in and form a part of this specification, illustrate embodiments of the System and Method for Law Enforcement Incident Reporting and together with the description, serve to explain the principles of this application.

FIG. 23 depicts an example of a smartphone screen shot of the Party Factors Module law enforcement codes (LE Codes) and special information data page for the mobile application version of the System and Method for Law Enforcement Incident Reporting.

FIG. 24 depicts an example of a smartphone screen shot of the Party Factors Module special information and other associated factors data page for the mobile application version of the System and Method for Law Enforcement Incident Reporting.

FIG. 25 depicts an example of a smartphone screen shot of the Party Factors Module movement preceding collision data page for the mobile application version of the System and Method for Law Enforcement Incident Reporting.

FIG. 26 depicts an example of a smartphone screen shot of the Party Factors Module movement preceding collision and sobriety drug physical data page for the mobile application version of the System and Method for Law Enforcement Incident Reporting.

FIG. 35 depicts an example of a smartphone screen shot of the Crash Details page for the gathering of traffic control devices type of collision details related to the incident/collision for the mobile application version of the System and Method for Law Enforcement Incident Reporting.

FIG. 36 depicts an example of a smartphone screen shot of the Crash Details page for the gathering of motor vehicle involved with and pedestrian actions details related to the incident/collision for the mobile application version of the System and Method for Law Enforcement Incident Reporting.

FIG. 37 depicts an example of a smartphone screen shot of the Crash Details page for the gathering of motor vehicle involved with and pedestrian actions details related to the incident/collision for the mobile application version of the System and Method for Law Enforcement Incident Reporting.

FIG. 38 depicts an example of a smartphone screen shot of the Narrative page for the documenting of the written narrative section of the incident/collision report generated from the data gathered by law enforcement officers at the scene of the incident/collision.

DETAILED DESCRIPTION OF THE PREFERRED EMBODIMENTS

As required, the detailed embodiments of the present System and Method for Law Enforcement Incident Reporting 10 are disclosed herein, however, it is to be understood that the disclosed embodiments are merely exemplary of the design that may be embodied in various forms. Therefore, specific functional and structural details disclosed herein are not to be interpreted as limiting, but merely as basic for the claims and as a representative basis for teaching one skilled in the art to variously employ the present design in virtually any appropriately detailed structure as well as combination.

Figure 1:
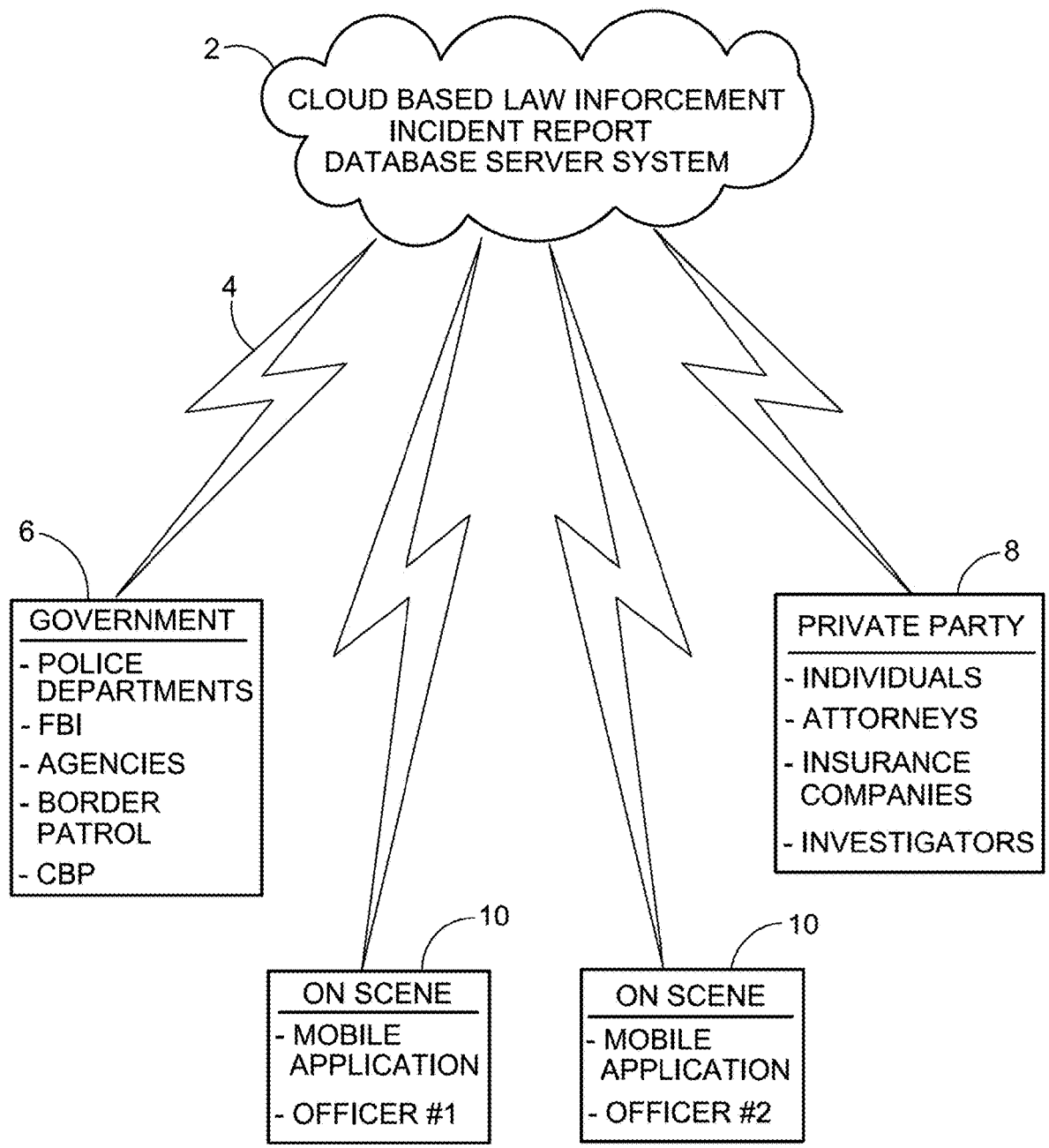
FIG. 1 depicts a diagrammatic representation of the wireless communications structure of incident reports entered into the mobile application by law enforcement officers at the incident scene, in the cloud based law enforcement incident report database server system and incident report data transmitted to be distributed to governmental agencies as well as private parties.

FIG. 1 depicts a diagrammatic representation of the System and Method for Law Enforcement Incident Reporting 10 being used by Officer #1 10 and Officer #2 illustrating the wireless communications structure of incident reports entered into the mobile application system 10 by one or more law enforcement officers at the incident scene. The cloud-based law enforcement incident report database server system 2 receives incident report data transmitted by law enforcement personnel via the system 10 to be distributed to governmental agencies 6 as well as private parties 8. Often it is important for officers that arrive at an incident scene be caught up quickly, or take over for the first responding officer in gathering data for the incident report. In the Method for Law Enforcement Incident Reporting 10, Officer #1 can relay all gathered info to Officer #2 through the mobile application system cloud-based database. After the report is written and completed, it is uploaded to the cloud-based law enforcement incident report database 2 residing on a server system 2 administering the cloud data. These reports can then be disseminated to government agencies 6 like the reporting and other interested police departments, the FBI, other state, local or federal agencies, the border patrol, Customs and Border Protection (CBP) and the like. Additionally, the reports can be disseminated to private parties 8 such as individual citizens, attorneys, insurance companies, investigators and interested institutions, etc. In this way, both government officials and private parties can mine the incident report data as desired or required, and generate further reports such as statistics, demographical data profiles and the like. Courts, attorneys and individuals can also obtain incident reports for trials, mediation and arbitration proceedings.

Figure 2:
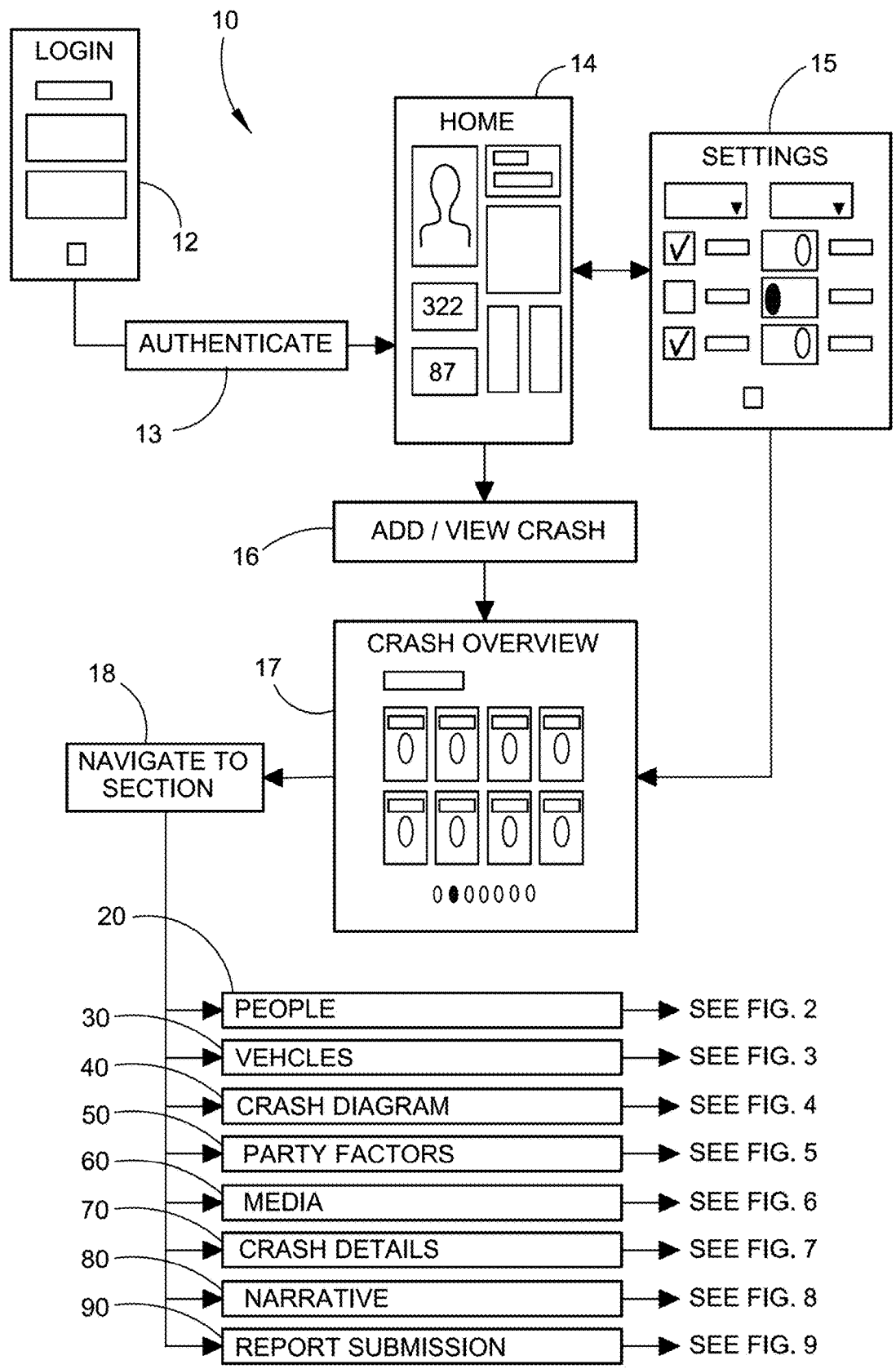
FIG. 2 depicts a diagrammatic representation of an overview of the system illustrating the login page, home page, settings page, and crash overview page which is used to navigate to the eight incident report data modules within the system.

FIG. 2 depicts a diagrammatic representation of an overview of the System and Method for Law Enforcement Incident Reporting 10 mobile application system illustrating the login page 12, the home page 14, the settings page 15, and the crash overview page 17 which is used to navigate 18 to the eight incident report data section modules 20, 30, 40, 50, 60, 70, 80 and 90 within the system. Law enforcement personnel users arriving on scene and wishing to use the mobile application system 10 would log in on the login page 12, and once authenticated 13, would be directed to a home page 14. From the home page 14 the user could go to the settings page 15 to adjust any system settings or touch add/view crash 16 to start or continue an incident report from the crash overview page 17. From the crash overview page 17, the user can navigate 18 to any desired section module 20, 30, 40, 50, 60, 70, 80 and 90 within the system. For example, if the law enforcement officer on scene wished to download available media of the crash from witnesses smartphones, then that officer user would navigate to the Media section module 60 from the crash overview page 17. Alternatively, after the data was gathered and the officer wished to write the narrative of the incident/collision report, they could navigate to the Narrative section module 80 from the crash overview page 17, and so on. Each of the eight modules can be brought up from the crash overview page 17 to continue an existing report, or to start a new incident/collision report.

Figure 3:
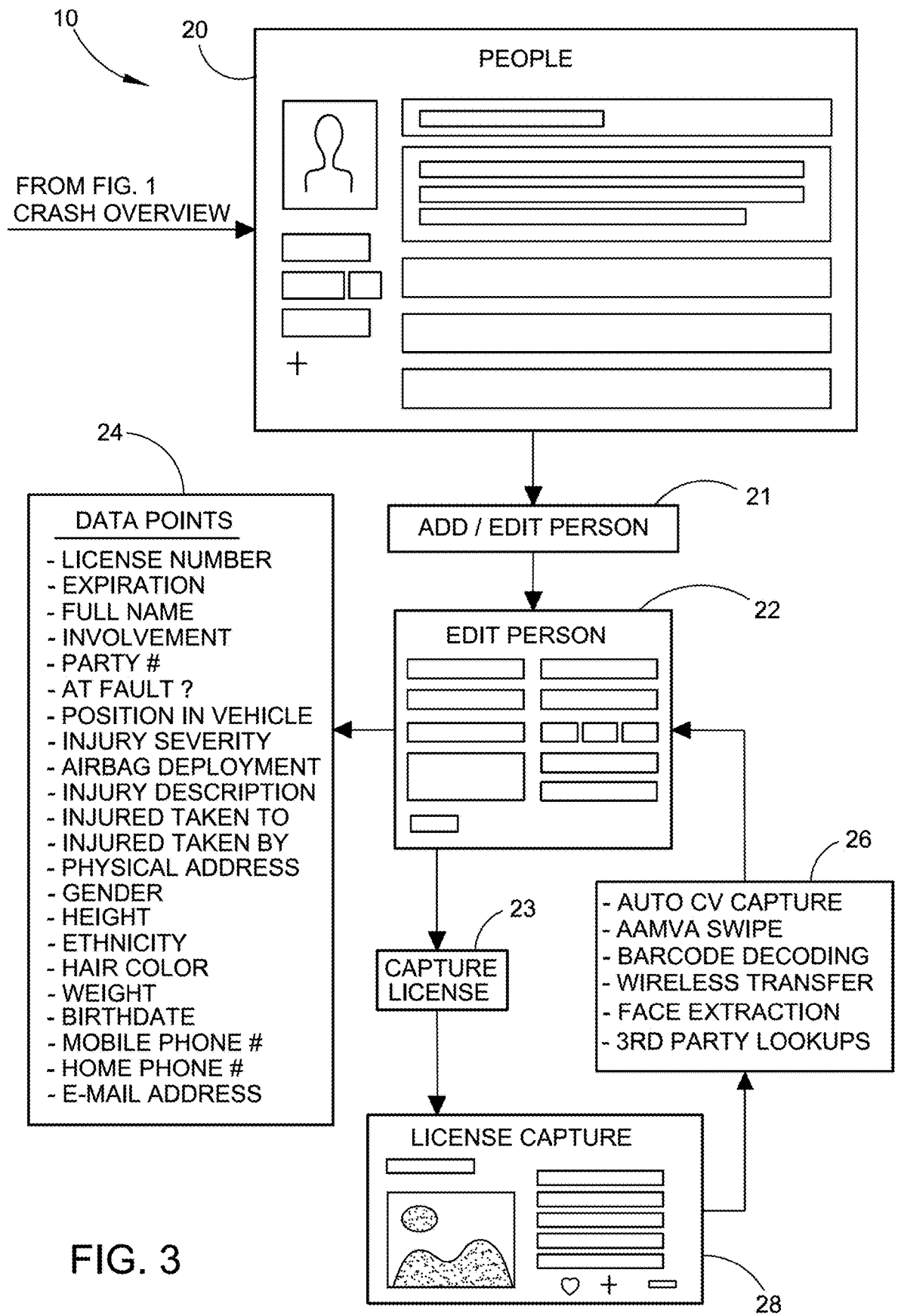
FIG. 3 depicts a diagrammatic representation of the People module used to gather incident data relating to the people involved in the incident, as an example here a collision, being reported on by law enforcement officers at the scene of the incident/collision.

FIG. 3 depicts a diagrammatic representation of the People module 20 of the System and Method for Law Enforcement Incident Reporting 10. The People module 20 is reached through the Crash Overview page 17 (see FIG. 2), and is used to gather incident data relating to the people involved in the incident. As an example throughout the rest of this patent application here the incident being reported on by law enforcement personnel users of the system 10 is an incident/collision, and it is being reported on by law enforcement officers at the scene of the incident/collision. From the People module 20 a user can add or edit a person 21 involved in the incident/collision. The edit person screen 22 can use any of a number of data points 24 as well as capture the persons data from a scan of their driver license 23 information stored on the QR code, chip and/or magnetic stripe embedded in or found on the driver license card. License capture 23 results in an ordered display 28 of the driver license information derived from the license capture 23. Moreover, the data from a driver license capture 26 can be used to populate the add/edit person screen 22 with information derived from the driver license capture scan 23. The anticipated relevant data points 24 for the edit person screen use are: license number, license expiration, full name, involvement, party number, at fault (yes or no), position within vehicle (driver side, front seat, back seat passenger side), injury severity, airbag deployment, injury description, injured taken to, injured taken by, physical address, gender, height, ethnicity, hair color, weight, birthdate, mobile phone number, home phone number and e-mail address, to name a few. The relevant data 26 derived from the license capture task 28 includes: auto computer vision capture data and photos, American Association of Motor Vehicle Administration (AAMV) swipe data, barcode decoding data, wireless transfer data, face extraction data and third party look ups data, and the like to name a few.

Figure 4:
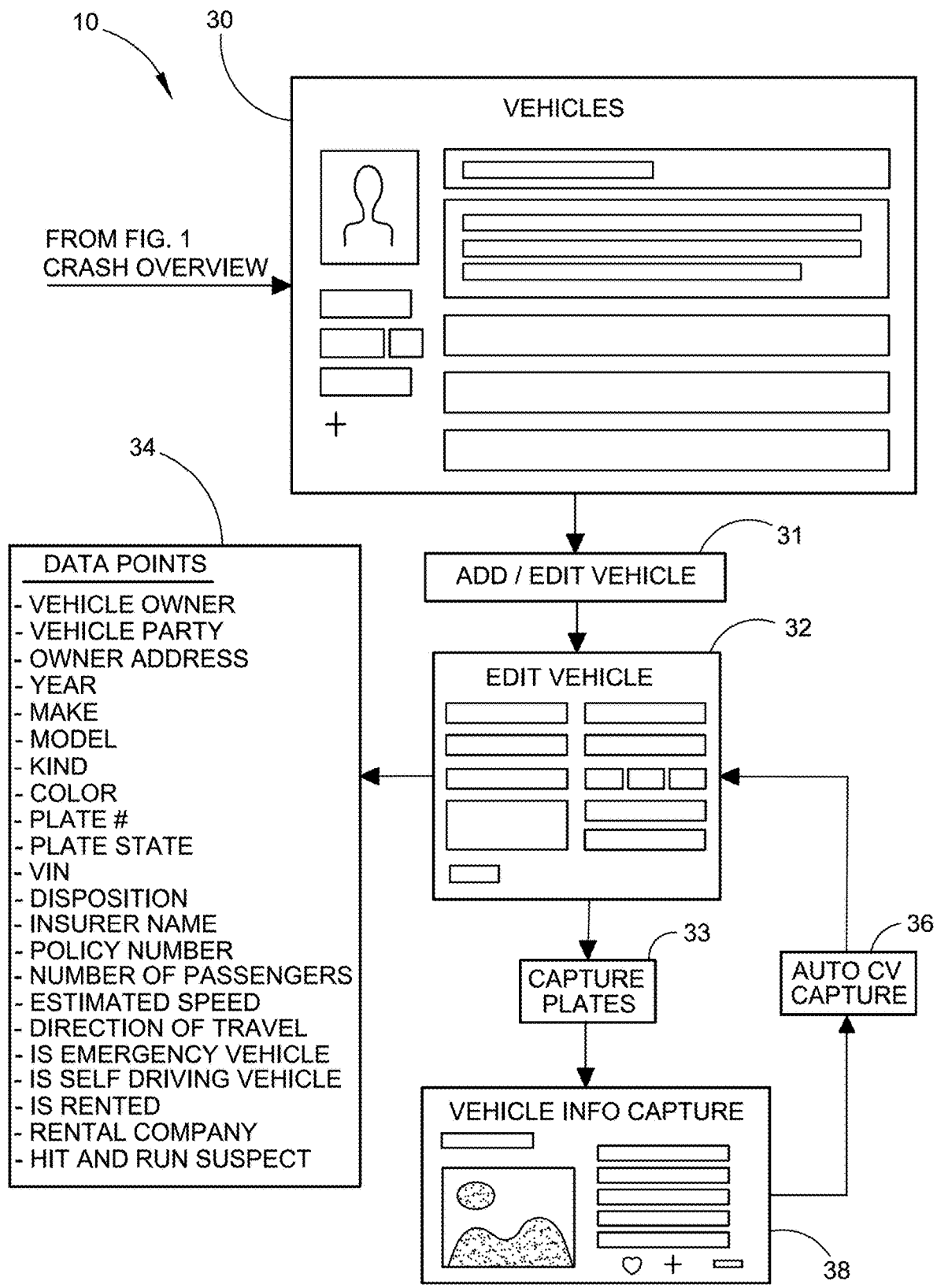
FIG. 4 depicts a diagrammatic representation of the Vehicles module used to gather incident/collision data relating to the vehicles involved in the incident/collision being reported on by law enforcement officers at the scene of the incident/collision.

FIG. 4 depicts a diagrammatic representation of the Vehicles module 30 of the System and Method for Law Enforcement Incident Reporting 10. The Vehicle module 30 is used to gather incident/collision data relating to the vehicles involved in the incident/collision being reported on by law enforcement officers at the scene of the incident/collision. The Vehicles module 30 is reached through the Crash Overview page 17 (see FIG. 2), and is used to gather incident data relating to all of the vehicles involved in the incident/collision. From the Vehicles module 30 a user can add or edit a vehicle 31 involved in the incident/collision. The edit vehicle screen 32 can use any of a number of data points 34 as well as capture the vehicle data from a scan of their license plates 33 or any information stored on the vehicle registration data from the computer look up, a QR code, an onboard chip and/or magnetic stripe embedded in or found on the license plate or a registration card. Vehicle info capture 33 results in an ordered display 38 of the vehicle information derived from the vehicle info capture 33. Furthermore, the data from an auto computer vision (CV) capture 36 can be used to populate the add/edit person screen 32 with information derived from the vehicle info capture 38 screen. The anticipated relevant data points 34 for the edit person screen use are: vehicle owner, vehicle party, owner address, year, make, model, kind, color, plate number, plate state, vehicle identification number (VIN), disposition, insurer name, policy number, number of passengers, estimated speed, direction of travel, is emergency vehicle, is self-driving vehicle, is rented, rental company, and hit and run suspect, to name a few. The relevant data 36 derived from the vehicle info capture task 38 and auto CV capture task 36 includes: vehicle identification number (VIN), auto make, year and model, registered vehicle owner, insurance provider, insurance coverage, registration validity, recent registration payment, amount of registration charged, gross vehicle weight, number of axles, and title information such as salvage title, and third party look up data, etc., and the like to name a few.

Figure 5:
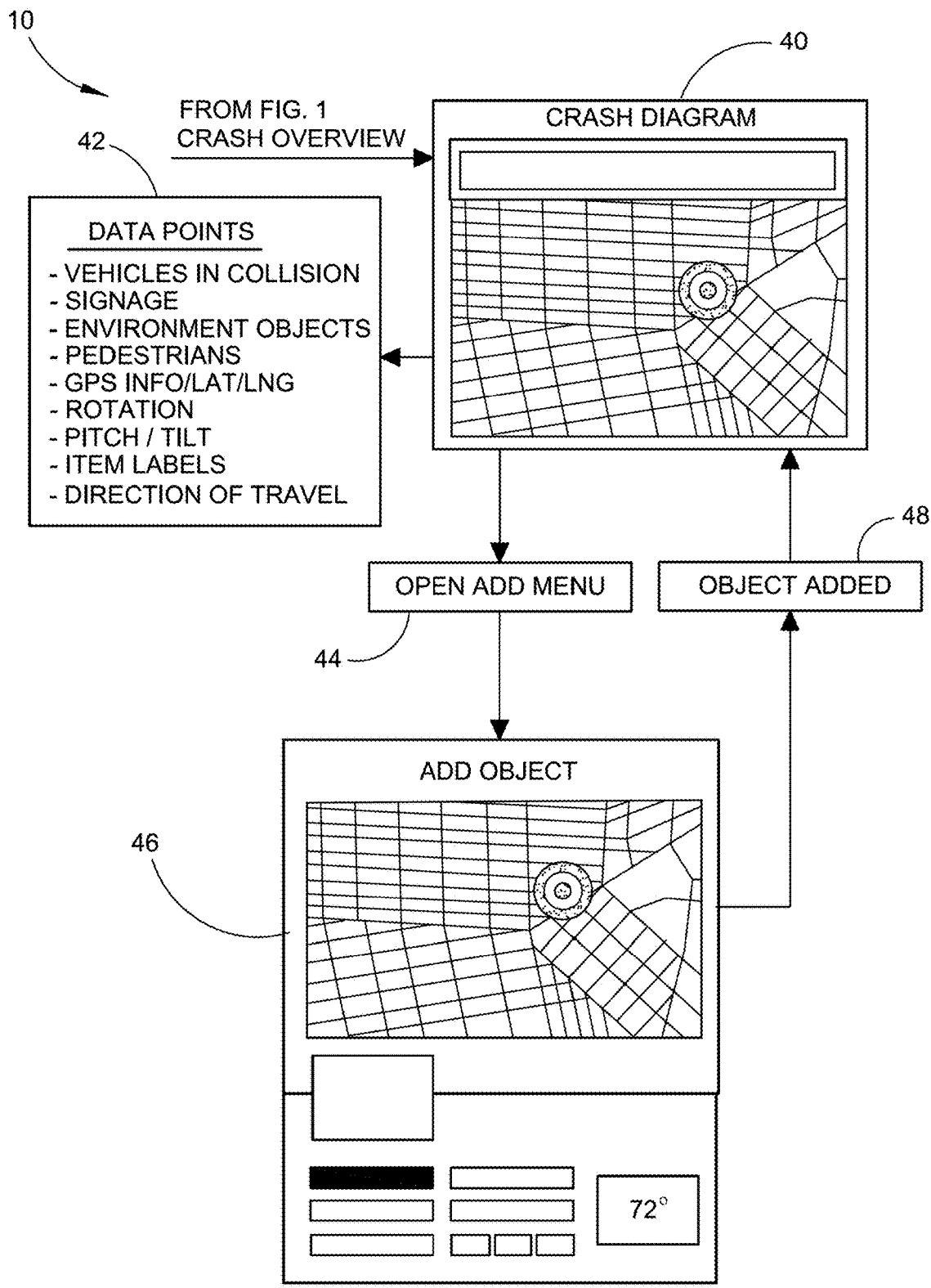
FIG. 5 depicts a diagrammatic representation of the Crash Diagram module used to gather incident/collision data relating to the location mapping and physical environment surrounding the incident/collision being reported on by law enforcement officers at the scene of the incident/collision.

FIG. 5 depicts a diagrammatic representation of the Crash Diagram module 40 of the System and Method for Law Enforcement Incident Reporting 10. The Crash Diagram module 40 is used to gather incident/collision data relating to the location GPS mapping and physical environment surrounding the incident/collision being reported on by law enforcement officers at the scene of the incident/collision. The Crash Diagram module 40 is reached through the Crash Overview page 17 (see FIG. 2). The Crash Diagram screen 40 starts with a GPS positioned map of the location of the incident/collision and derives information from numerous data points 42 to create a map diagram representation of the incident/collision with the position of all involved parties and vehicles as well as environment surrounding the incident scene such as traffic control devices and signage. From the Crash Diagram screen 40 a user can open add menu 44 and add objects 46 to the map indicating various positions and environment within the crash diagram which results in objects added to the crash diagram screen 40. Relevant anticipated data points 42 include: vehicle in position in incident/collision, signage, environment objects, pedestrians, GPS information, latitude, longitude, rotation, pitch and tilt, item labels and direction of travel arrows, ambient temperature, and the like to name a few.

Figure 6:
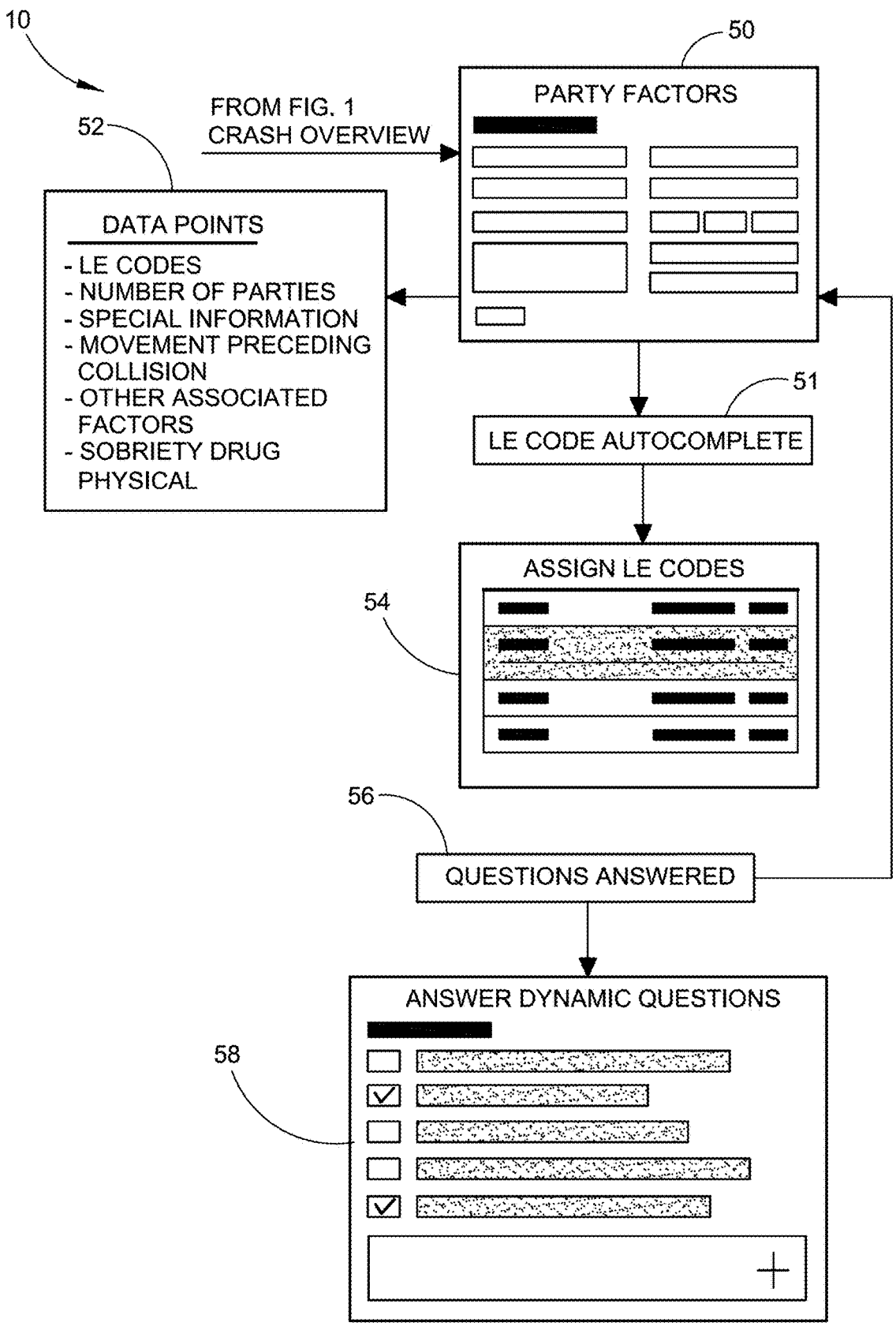
FIG. 6 depicts a diagrammatic representation of the Party Factors module used to gather incident/collision data relating to the party factors involved in the incident/collision being reported on by law enforcement officers at the scene of the incident/collision.

FIG. 6 depicts a diagrammatic representation of the Party Factors module 50 used to gather incident/collision data relating to the party factors involved in the incident/collision being reported on by law enforcement officers at the scene of the incident/collision. The Party Factors module 50 is reached through the Crash Overview page 17 (see FIG. 2). The Party Factors module 50 can be used to assign law enforcement (LE) codes 54 and includes an LE codes autocomplete feature 51. The Party Factors module 50 is also used to answer dynamic questions 58 regarding the incident/collision. Answered questions 56 are auto-populated into the Party Factors module 50 main screen. Data points 52 used to report on incidents/collisions within the Party Factors module 50 include: LE codes, number of parties, special information, movement preceding collision, other associated factors, and sobriety drug physical.

Figure 7:
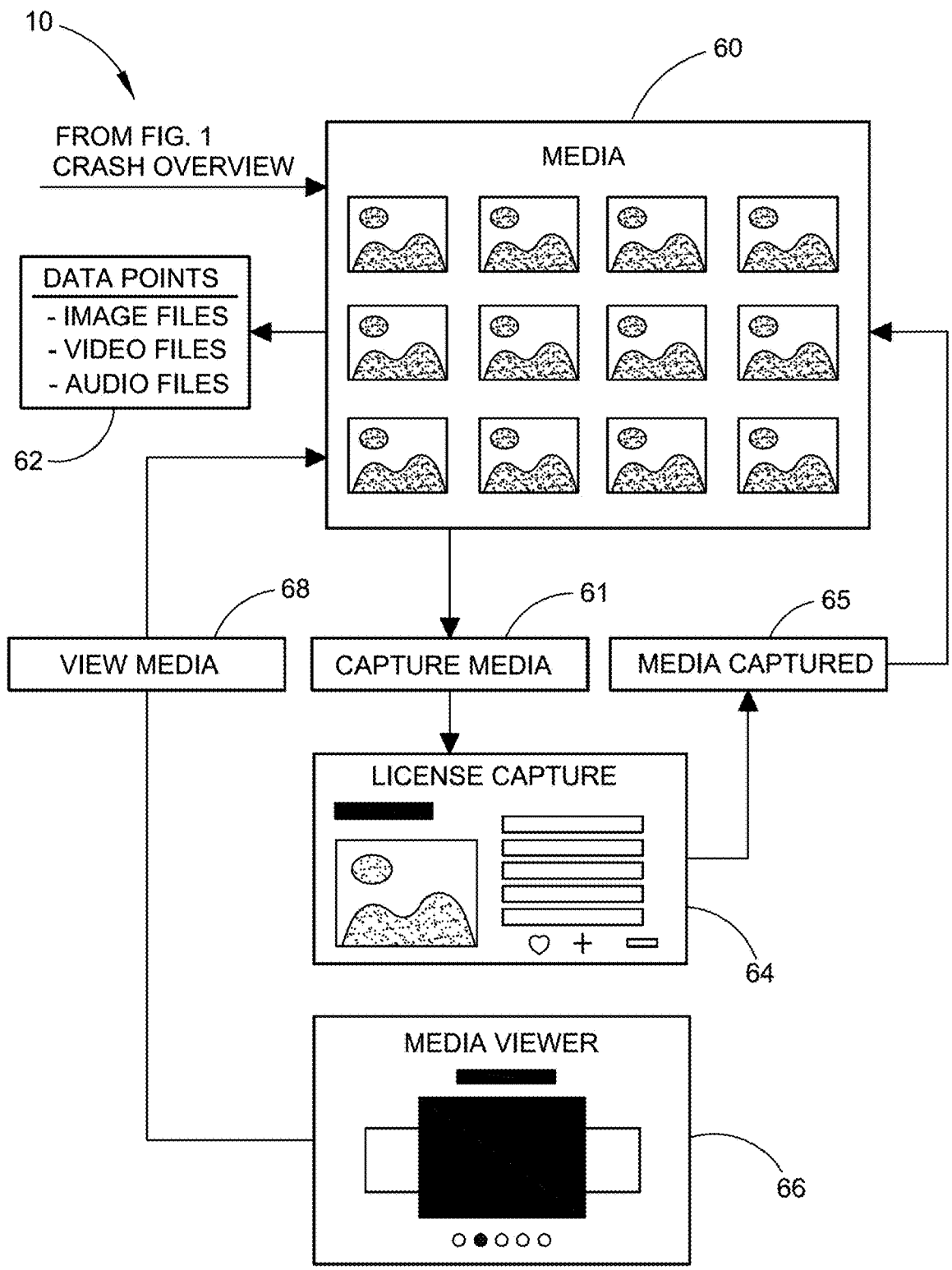
FIG. 7 depicts a diagrammatic representation of the Media module used to gather incident/collision data relating to the media, photos and videos applicable to the incident/collision being reported on by law enforcement officers at the scene of the incident/collision.

FIG. 7 depicts a diagrammatic representation of the Media module 60 used to gather incident/collision data relating to the media, photos and videos applicable to the incident/collision being reported on by law enforcement officers at the scene of the incident/collision. The Media module 60 is reached through the Crash Overview page 17 (see FIG. 2). The Media module 60 is used LE personnel to both capture and view media at the incident/collision scene and store collected media data for use in the final report. The Media module 60 captures media 61 and this includes the option of license capture 64. Media captured 65 is auto-populated into the main Media module screen 60. A media viewer 66 is used to view the media 68 that has been captured, or is considered to be captured, by LE officers at the scene. Data points 62 for media capture include: image files, video files and audio files. The relevant recorded media can be captured by LE officers wirelessly from witness smartphones or computers on scene using existing Bluetooth or Wi-Fi technologies available for transferring media from one smartphone or computer to another.

Figure 8:
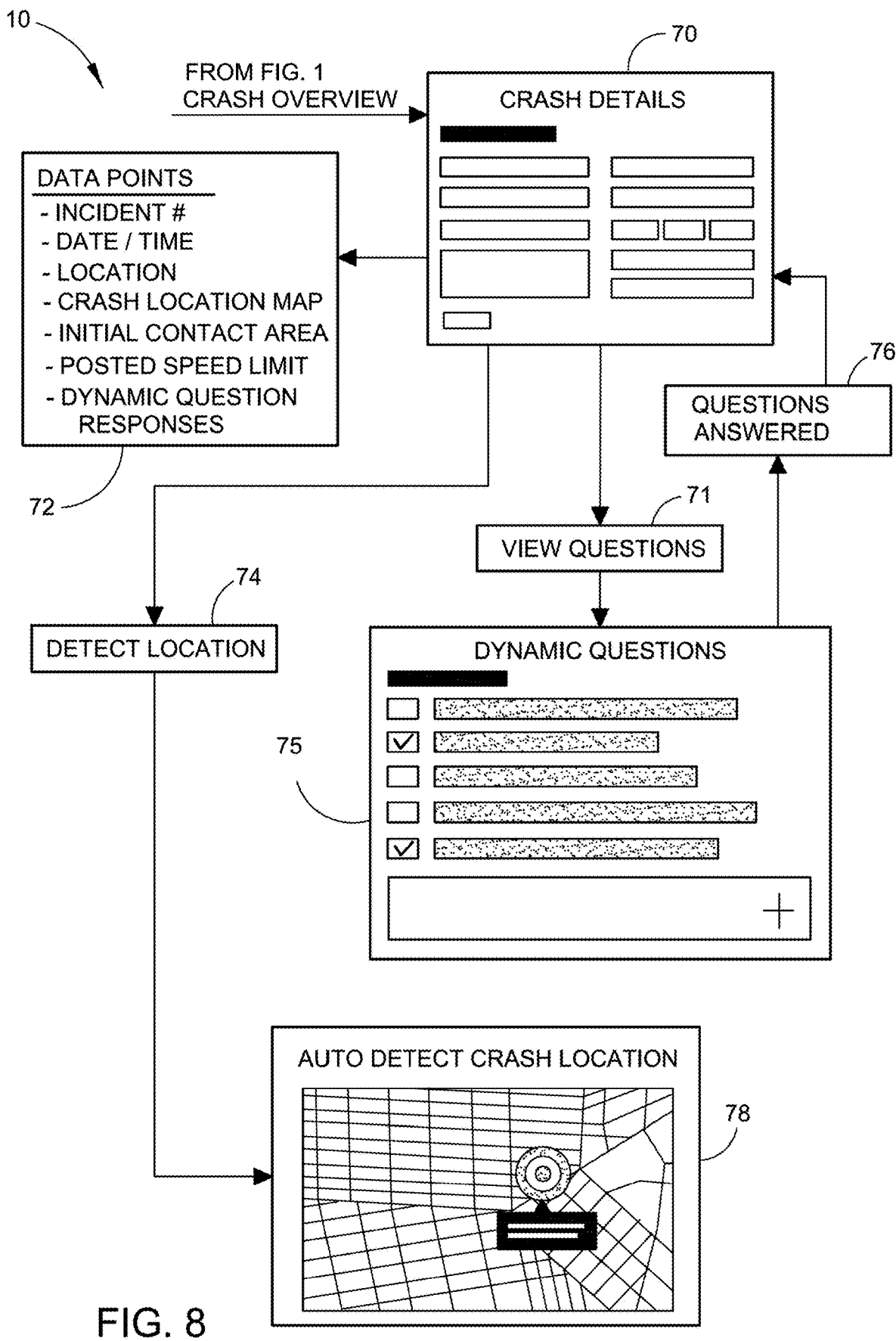
FIG. 8 depicts a diagrammatic representation of the Crash Details module used to gather incident/collision data relating to the crash details surrounding the incident/collision being reported on by law enforcement officers at the scene of the incident/collision.

FIG. 8 depicts a diagrammatic representation of the Crash Details module 70 used to gather incident/collision data relating to the crash details surrounding the incident/collision being reported on by law enforcement officers at the scene of the incident/collision. The Crash Details module 70 is reached through the Crash Overview page 17 (see FIG. 2). From the Crash details module 70 main screen, LE personnel can view questions 71 and answer dynamic questions 75 regarding incident/collision details on scene. Questions answered 76 are auto-populated into the Crash details module main screen 70. The Crash Details module 70 can also be used to auto-detect an incident/collision/crash location 78 through the detect location 74 feature using GPS coordinates once the reporting officer is at the crash location scene. Data points 72 used by the Crash Details module 70 include: incident number, date and time, location, crash location map, initial contact area, posted speed limit, and dynamic question responses.

Figure 9:
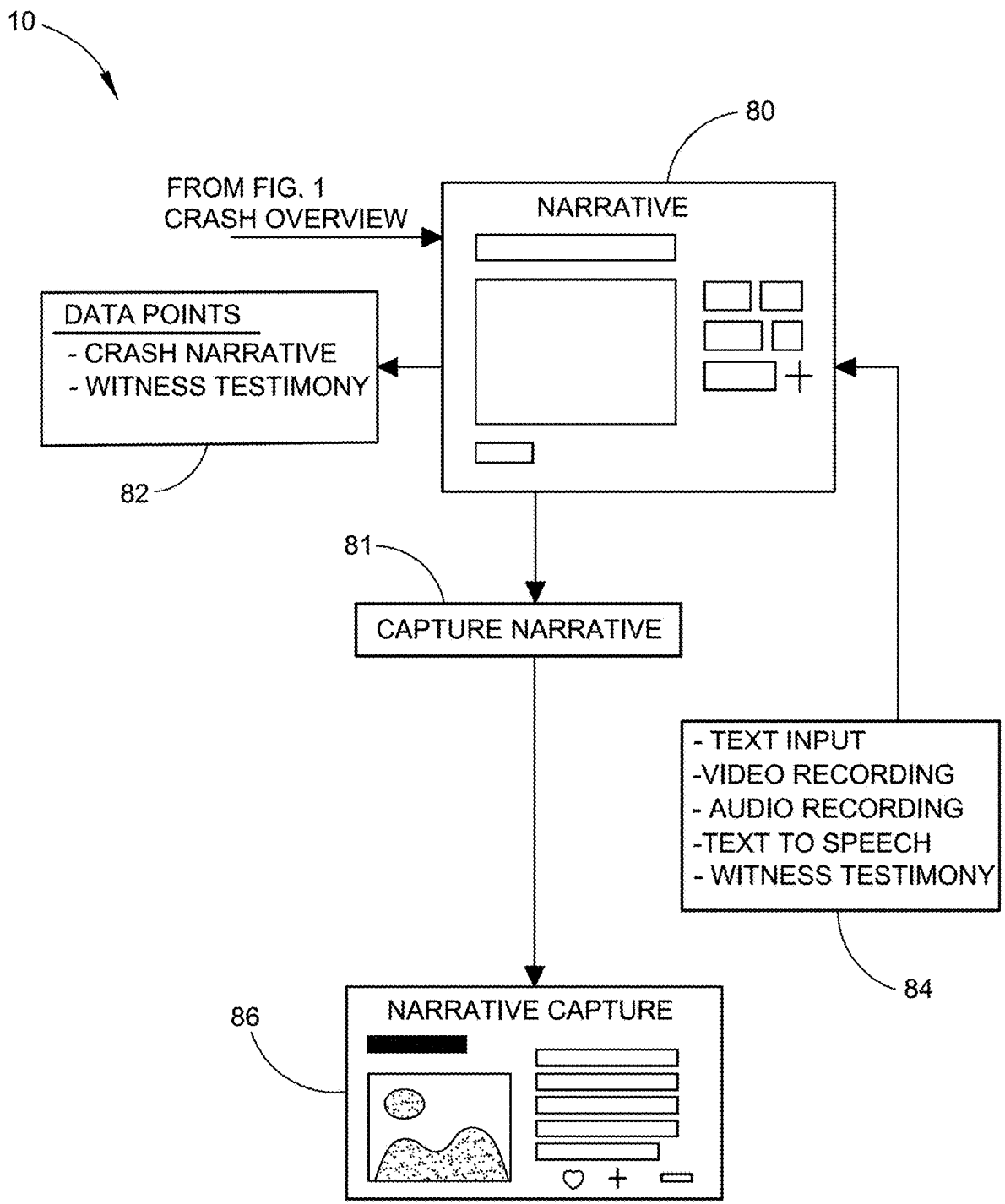
FIG. 9 depicts a diagrammatic representation of the Narrative module used to report on incident/collision data relating to the report narrative generated from the incident/collision data being collected and documented on by law enforcement officers at the scene of the incident/collision.

FIG. 9 depicts a diagrammatic representation of the Narrative module 80 used to report on incident/collision data relating to the report narrative generated from the incident/collision data being collected and documented on by law enforcement officers at the scene of the incident/collision. The Narrative module 80 is reached through the Crash Overview page 17 (see FIG. 2). From the Narrative module 80 main screen. LE personnel can capture narrative 81 through a narrative capture feature 86. Narratives are built using factors 84 such as text input, video recording input, audio recording input, text to speech input and witness testimony input. Data points relevant to the Narrative module 82 include: a crash narrative and witness testimony.

Figure 10:
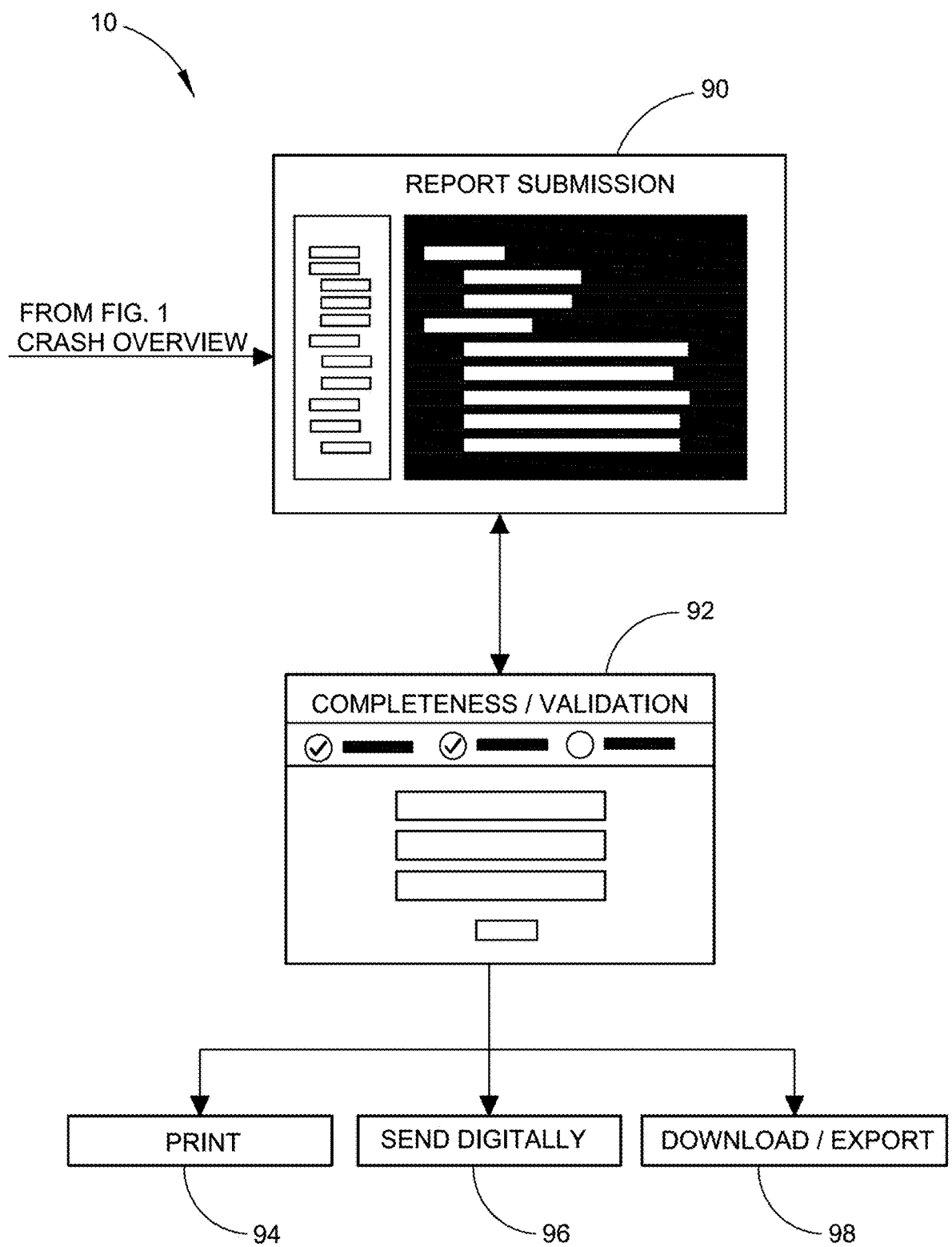
FIG. 10 depicts a diagrammatic representation of the Report Submission module used to report incident/collision data relating to the communications of reports generated from the incident/collision being documented on by law enforcement officers at the scene of the incident/collision.

FIG. 10 depicts a diagrammatic representation of the Report Submission module 90 used to report incident/collision data relating to the communications of reports generated from the incident/collision being documented on by law enforcement officers at the scene of the incident/collision. The Report Submission module 90 is reached through the Crash Overview page 17 (see FIG. 2). From the Report Submission module 90 main screen. LE personnel can check the entire incident/collision report for completeness and validation 92. A completed validated report can then be printed 94, sent digitally 96 or downloaded and exported 98. It is also anticipated that complete validated reports will be uploaded to a cloud based law enforcement incident report database server system for further dissemination to governmental agencies, police departments, and he court system, as well as further dissemination to private parties, individuals, insurance companies, investigators and attorneys (see FIG. 1).

Figure 11:
FIG. 11 depicts an example of a smartphone screen shot of the login page for the mobile application version of the System and Method for Law Enforcement Incident Reporting.

FIG. 11 depicts an example of a smartphone screen shot of the Login page screen 100 for the mobile application version of the System and Method for Law Enforcement Incident Reporting. From this Login page screen 100 a user can log in and be authenticated to start a new incident/collision report or continue an existing incident/collision report.

Figure 12:
FIG. 12 depicts an example of a smartphone screen shot of the home page for the mobile application version of the System and Method for Law Enforcement Incident Reporting.

FIG. 12 depicts an example of a smartphone screen shot of the Home page 110 for the mobile application version of the System and Method for Law Enforcement Incident Reporting. Once a user is logged in, this Home page screen 110 is used to navigate to the desired report in order to start a new incident/collision report or continue an existing incident/collision report.

Figure 13:
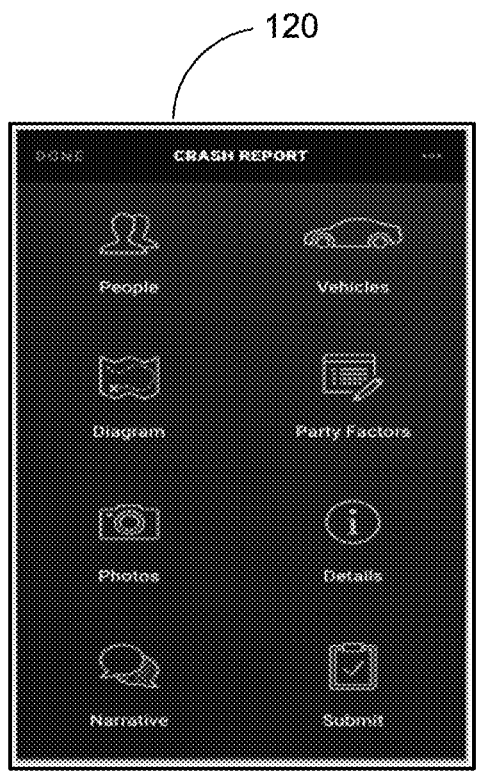
FIG. 13 depicts an example of a smartphone screen shot of the crash report crash overview page for the mobile application version of the System and Method for Law Enforcement Incident Reporting.

FIG. 13 depicts an example of a smartphone screen shot of the crash report Crash Overview page screen 120 for the mobile application version of the System and Method for Law Enforcement Incident Reporting. This Crash Overview page screen 120 is used to navigate to one of the numerous modules, including the People module, the Vehicles module, the Crash Diagram module, the Party Factors module, the Media module, the Crash Details module, the Narrative module and the Report Submission module.

Figure 14:
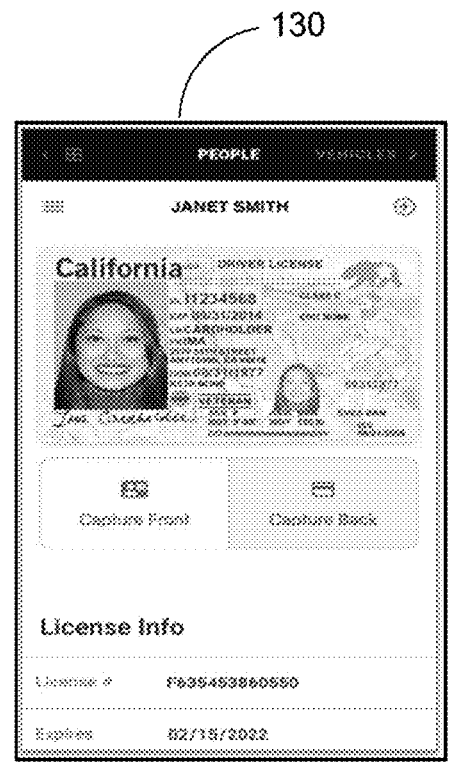
FIG. 14 depicts an example of a smartphone screen shot of the People Module vehicle capture page for the mobile application version of the System and Method for Law Enforcement Incident Reporting.

FIG. 14 depicts an example of a smartphone screen shot of the People Module license capture page screen 130 for the mobile application version of the System and Method for Law Enforcement Incident Reporting. Using the People Module license capture page screen 130 both the front and the back of the driver's license can be captured by computer vision. License info scanned from QR codes and barcodes on the driver's license is auto-populated into the appropriate fields such as license number, and expiration date of license.

Figures 15, 16, 17, 18:
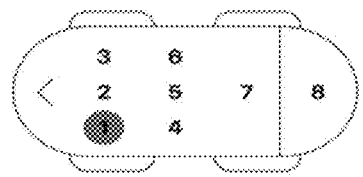
FIG. 15 depicts an example of a smartphone screen shot of the People Module name and involvement data page for the mobile application version of the System and Method for Law Enforcement Incident Reporting.
FIG. 16 depicts an example of a smartphone screen shot of the People Module injuries, addresses and characteristics page for the mobile application version of the System and Method for Law Enforcement Incident Reporting.
FIG. 17 depicts an example of a smartphone screen shot of the People Module contact and other actions page for the mobile application version of the System and Method for Law Enforcement Incident Reporting.
FIG. 18 depicts an example of a smartphone screen shot of the Vehicles Module owner and vehicle page for the mobile application version of the System and Method for Law Enforcement Incident Reporting.

FIG. 15 depicts an example of a smartphone screen shot of the People Module name and involvement data page screen 140 for the mobile application version of the System and Method for Law Enforcement Incident Reporting. This People Module name and involvement data page screen 140 is used to fill in the name of the involved person and the involvement of the involved person, such as position within the vehicle (driver or passenger and where seated), and whether or not the person was at fault.

FIG. 16 depicts an example of a smartphone screen shot of the People Module injuries, addresses and characteristics page screen 150 for the mobile application version of the System and Method for Law Enforcement Incident Reporting. This the People Module injuries, addresses and characteristics page screen 150 is used by LE personnel to document the injuries sustained in the incident/collision, the addresses of the injured or involved persons, and the characteristics of he injured or involved persons.

FIG. 17 depicts an example of a smartphone screen shot of the People Module contact and other actions page screen 160 for the mobile application version of the System and Method for Law Enforcement Incident Reporting. This People Module contact and other actions page screen 160 is used by LE personnel to document the characteristics of he injured or involved persons and to add involved persons contact information as well as perform other actions such as remove a person or clear a driver's license photo.

FIG. 18 depicts an example of a smartphone screen shot of the Vehicles Module owner and vehicle page screen 170 for the mobile application version of the System and Method for Law Enforcement Incident Reporting. This Vehicles Module owner and vehicle page screen 170 is used by LE personnel to document vehicle owner information and vehicle information such as year, make model, license plate number, VIN and disposition of the involved vehicle (whether or not the involved vehicle is drivable) after the incident/collision.

Figure 19:
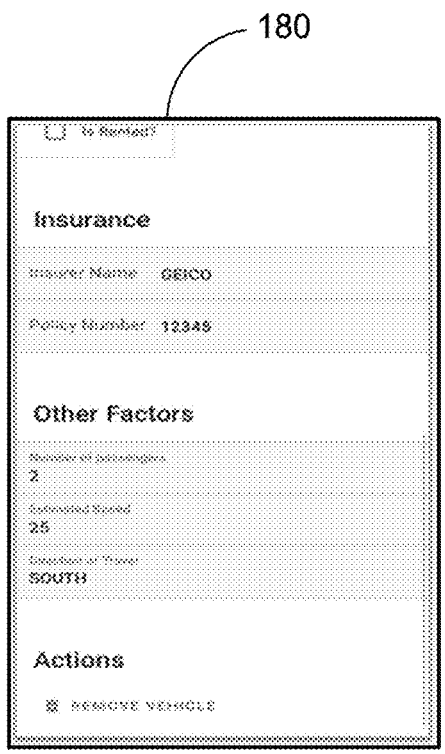
FIG. 19 depicts an example of a smartphone screen shot of the Vehicles Module insurance, other factors and actions page for the mobile application version of the System and Method for Law Enforcement Incident Reporting.

FIG. 19 depicts an example of a smartphone screen shot of the Vehicles Module insurance, other factors and actions page screen 180 for the mobile application version of the System and Method for Law Enforcement Incident Reporting. This Vehicles Module insurance, other factors and actions page screen 180 is used by LE personnel to document vehicle insurance information such as insurance provider name and insurance policy number, other factors such as number of passengers, estimated speed and direction of travel, and actions such as remove a vehicle.

Figure 20:
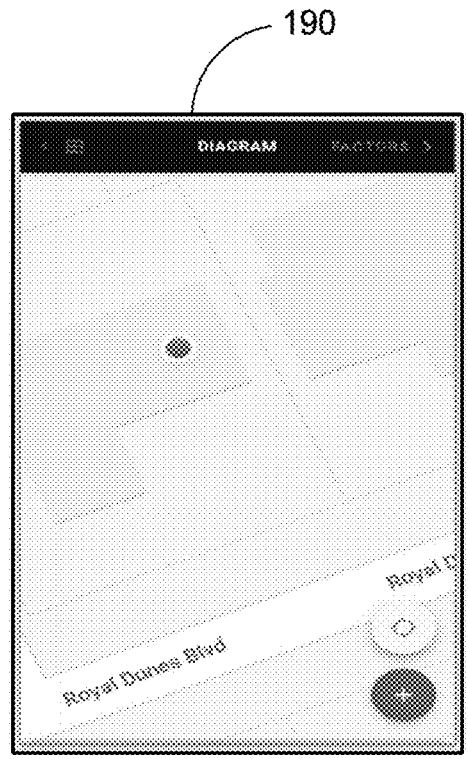
FIG. 20 depicts an example of a smartphone screen shot of the Crash Diagram Module incident location mapping page for the mobile application version of the System and Method for Law Enforcement Incident Reporting.

FIG. 20 depicts an example of a smartphone screen shot of the Crash Diagram Module incident location mapping page screen 190 for the mobile application version of the System and Method for Law Enforcement Incident Reporting. This Crash Diagram Module incident location mapping page screen 190 is used by LE personnel to document and map the location information for the incident/collision and to begin a crash diagram of the circumstances of the incident or collision.

Figure 21:
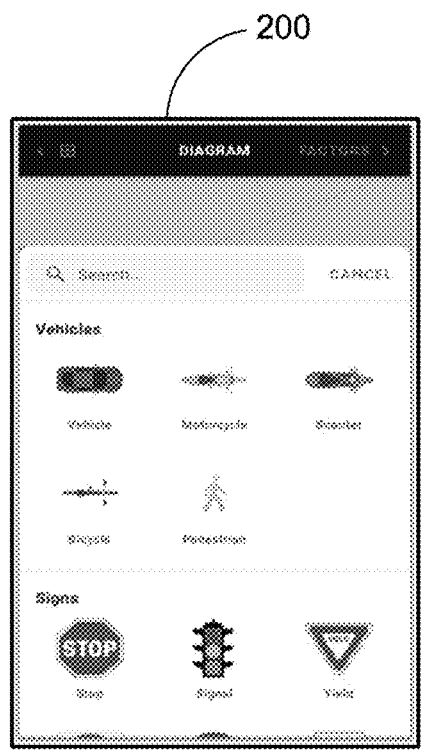
FIG. 21 depicts an example of a smartphone screen shot of the Crash Diagram Module incident icon symbols selection page, including vehicles and signs, for incident location mapping for the mobile application version of the System and Method for Law Enforcement Incident Reporting.

FIG. 21 depicts an example of a smartphone screen shot of the Crash Diagram Module incident icon symbols selection page screen 200, including vehicles and signs, for incident location mapping and diagramming for the mobile application version of the System and Method for Law Enforcement Incident Reporting. This Crash Diagram Module incident icon symbols selection page screen 200 is used by LE personnel to document and map the location information for the incident/collision and to begin a crash diagram of the circumstances of the incident or collision. This crash diagram will employ the symbols and icons of vehicles, pedestrians and traffic signs to show the locations and direction of travel for the various vehicles involved in the incident/collision. Additionally, it is anticipated that an animated video of the crash can be reconstructed, or that alternate reality (AR) can be used to show the environment surrounding the incident/collision.

Figure 22:
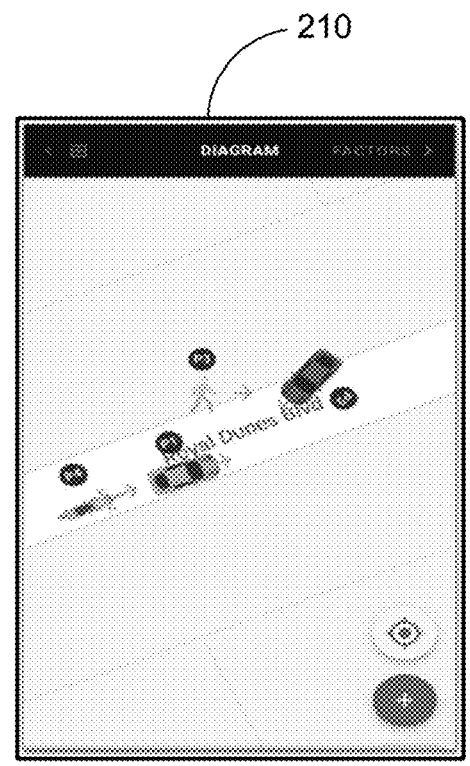
FIG. 22 depicts an example of a smartphone screen shot of the Crash Diagram Module incident vehicle and/or pedestrian position location mapping page for the mobile application version of the System and Method for Law Enforcement Incident Reporting.

FIG. 22 depicts an example of a smartphone screen shot of the Crash Diagram Module incident vehicle and/or pedestrian position location diagramming page screen 210 for the mobile application version of the System and Method for Law Enforcement Incident Reporting. This Crash Diagram Module incident vehicle and/or pedestrian position location diagramming page screen 210 illustrates the completed diagram of the incident/collision for entry into the final incident/collision report. The diagram may contain animated video, AR environment, and/or a still diagram for the spacial analysis of the vehicles involved in the incident/collision, the direction of travel and the position of vehicles and pedestrians involved in the incident/collision.

Figures 23, 24, 25, 26:
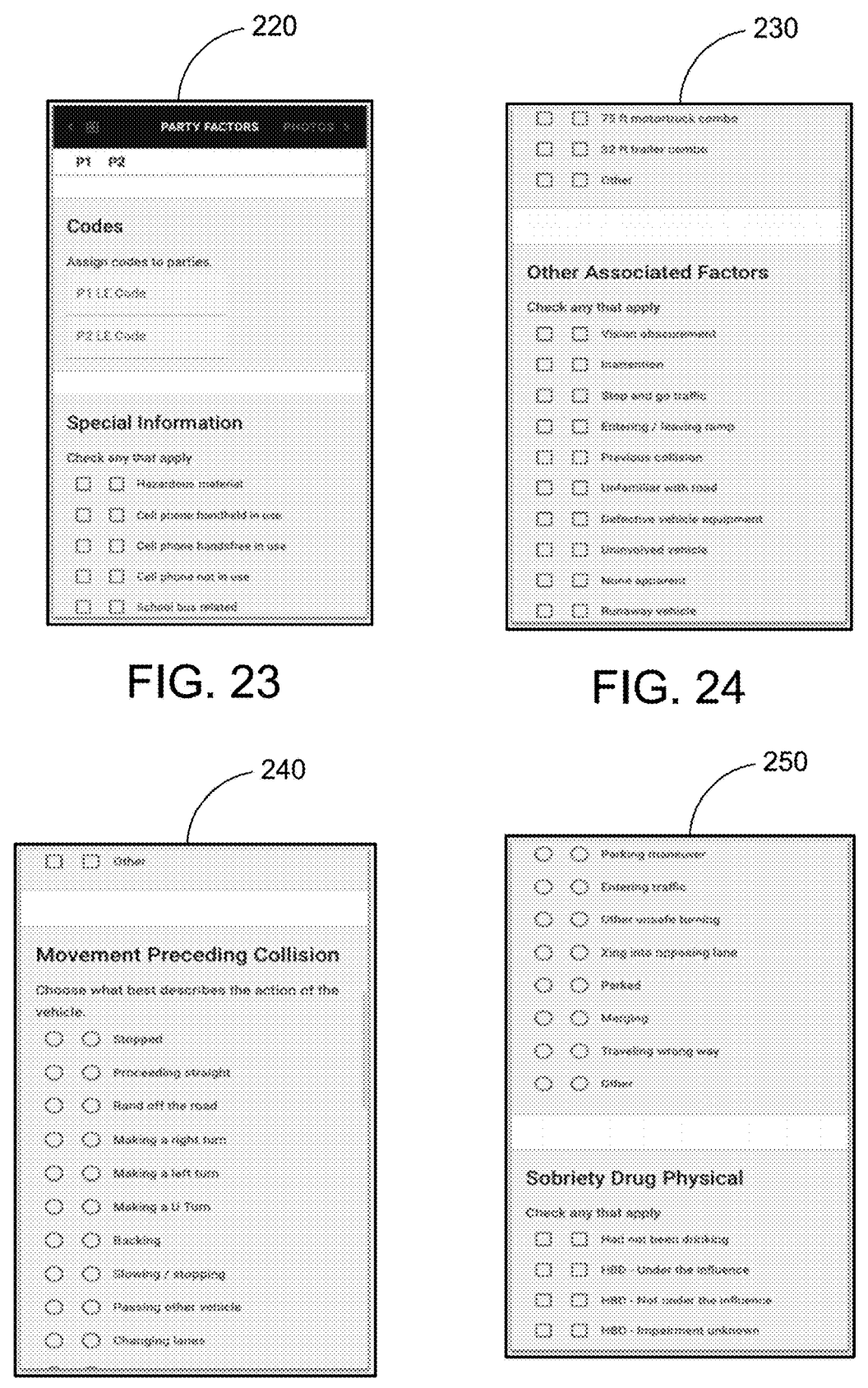

FIG. 23 depicts an example of a smartphone screen shot of the Party Factors Module law enforcement codes (LE Codes) and special information data page screen 220 for the mobile application version of the System and Method for Law Enforcement Incident Reporting. This Party Factors Module law enforcement codes (LE Codes) and special information data page screen 220 is used by law enforcement personnel to add parties P1, P2, etc. and to indicate and assign LE codes to those parties. Additionally, special information can be entered under each of the indicated parties P1, P2, etc. by checking all boxes that apply. The special information can include hazardous material, cell phone handheld in use, cell phone handsfree in use, cell phone not in use, school bus related, 75 ft. motortruck combo, 35 ft. trailer combo and other.

FIG. 24 depicts an example of a smartphone screen shot of the Party Factors Module special information and other associated factors data page screen 230 for the mobile application version of the System and Method for Law Enforcement Incident Reporting. This Party Factors Module special information and other associated factors data page screen 230 is used by law enforcement personnel to document each parties' other associated factors by checking all boxes that apply to the incident/collision being reported on. The other associated factors may include vision obscurement, inattention, stop and go traffic, entering/leaving ramp, previous collision, unfamiliar with road, defective vehicle equipment, none apparent, runaway vehicle and other.

FIG. 25 depicts an example of a smartphone screen shot of the Party Factors Module movement preceding collision data page screen 240 for the mobile application version of the System and Method for Law Enforcement Incident Reporting. This Party Factors Module movement preceding collision data page screen 240 is used by law enforcement personnel to document each parties' movement preceding collision factors by choosing what best describes the action of the vehicle involved with the incident/collision being reported on. The movement preceding collision factors may include stopped, proceeding straight, rand off the road, making a right turn, making a left turn, making a U Turn, backing, slowing/stopping, passing other vehicle, changing lanes, parking maneuver, entering traffic, other unsafe turning, Xing into opposing lane, parking, merged, traveling wrong way, and other.

FIG. 26 depicts an example of a smartphone screen shot of the Party Factors Module movement preceding collision (a continuation of FIG. 25) and sobriety drug physical data page screen 250 for the mobile application version of the System and Method for Law Enforcement Incident Reporting. This sobriety drug physical data page screen 250 is used by LE personnel to document each parties' sobriety drug physical factors by checking any box that applies for each party. For the various factors documented see FIG. 27 below.

Figure 27:
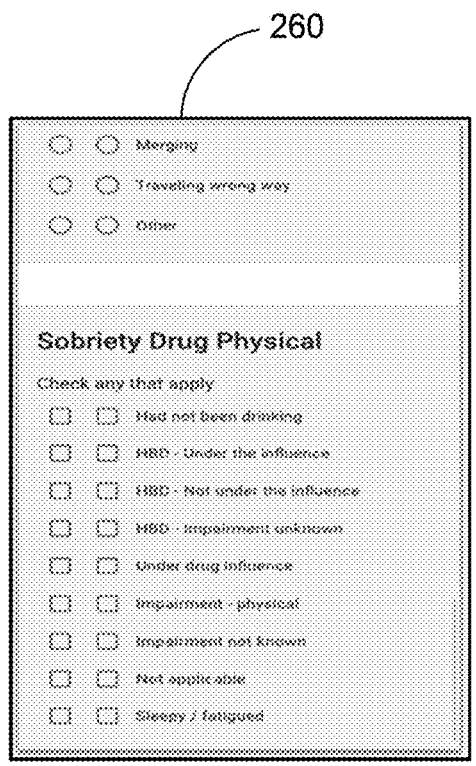
FIG. 27 depicts an example of a smartphone screen shot of the Party Factors Module movement preceding collision and sobriety drug physical data page for the mobile application version of the System and Method for Law Enforcement Incident Reporting.

FIG. 27 depicts an example of a smartphone screen shot of the Party Factors Module sobriety drug physical data page screen 260 for the mobile application version of the System and Method for Law Enforcement Incident Reporting. This sobriety drug physical data page screen 260 is used by LE personnel to document each parties' sobriety drug physical factors by checking any box that applies for each party. The various sobriety drug physical factors documented may include had not been drinking, had been drinking (HBD) —under the influence, HBD—not under the influence, HBD—impairment unknown, under drug influence, impairment—physical, impairment not known, not applicable and sleepy/fatigued.

Figure 28:
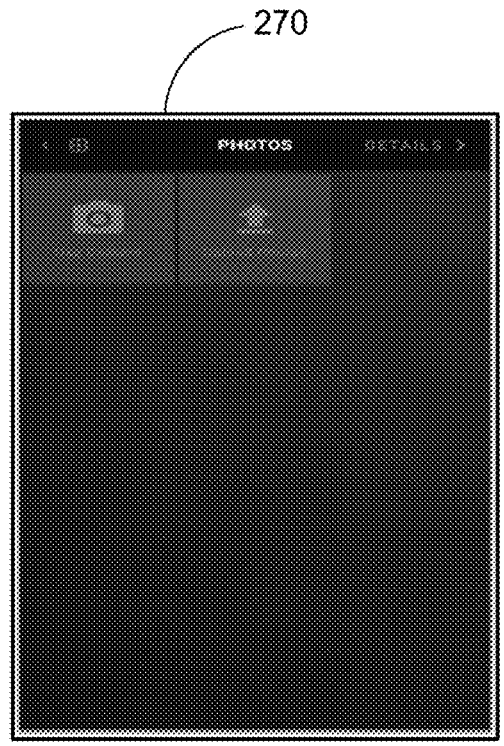
FIG. 28 depicts an example of a smartphone screen shot of the Media page for the gathering of media, photos and videos, related to the incident/collision for the mobile application version of the System and Method for Law Enforcement Incident Reporting.

FIG. 28 depicts an example of a smartphone screen shot of the Media capture page screen 270 for the gathering of media, photos and videos, related to the incident/collision for the mobile application version of the System and Method for Law Enforcement Incident Reporting. This Media capture page screen 270 is used by LE personnel to document the incident/collision by obtaining any media related to the incident/collision through the system's media capture feature. Photos and video, as well as any available audio files can be transferred to the system via Bluetooth and/or Wi-Fi connections with other smartphone or storage units which contain the available media.

Figure 29:
FIG. 29 depicts an example of a smartphone screen shot of the Media page for the gathering of media, here adding photos related to the incident/collision for the mobile application version of the System and Method for Law Enforcement Incident Reporting.

FIG. 29 depicts an example of a smartphone screen shot of the Media page screen 280 for the gathering of media, here adding photos related to the incident/collision for the mobile application version of the System and Method for Law Enforcement Incident Reporting. Here the Media page screen 280 shows four examples of still photos uploaded to the system.

Figure 30:
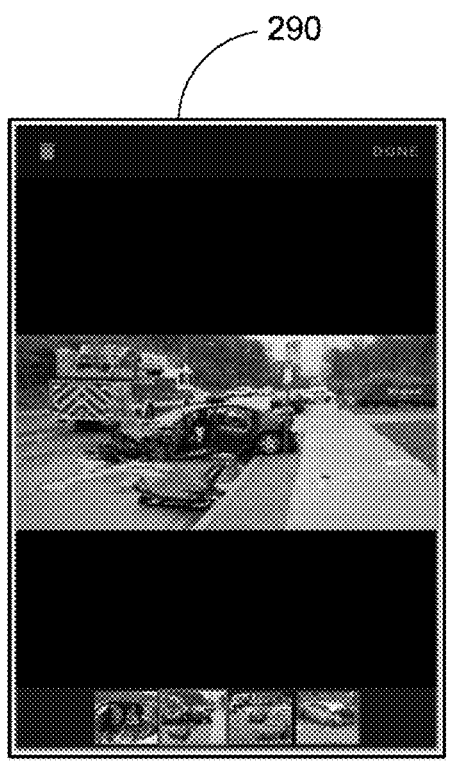
FIG. 30 depicts an example of a smartphone screen shot of the Media page for the gathering of media, here adding videos related to the incident/collision for the mobile application version of the System and Method for Law Enforcement Incident Reporting.

FIG. 30 depicts an example of a smartphone screen shot of the Media page screen 290 for the gathering of media, here adding videos related to the incident/collision for the mobile application version of the System and Method for Law Enforcement Incident Reporting.

Here the media viewer is being used to view uploaded media. Video files can be viewed in real-time motion, slow-motion or individual frame-by-frame, as well as stopped and run in reverse motion at any video frame.

Figures 31, 32, 33, 34:
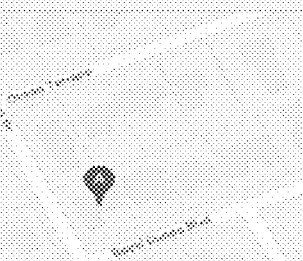
FIG. 31 depicts an example of a smartphone screen shot of the Crash Details page for the gathering of general and location details related to the incident/collision for the mobile application version of the System and Method for Law Enforcement Incident Reporting.
FIG. 32 depicts an example of a smartphone screen shot of the Crash Details page for the gathering of location and weather details related to the incident/collision for the mobile application version of the System and Method for Law Enforcement Incident Reporting.
FIG. 33 depicts an example of a smartphone screen shot of the Crash Details page for the gathering of lighting and roadway surface details related to the incident/collision for the mobile application version of the System and Method for Law Enforcement Incident Reporting.
FIG. 34 depicts an example of a smartphone screen shot of the Crash Details page for the gathering of roadway conditions and traffic control devices details related to the incident/collision for the mobile application version of the System and Method for Law Enforcement Incident Reporting.

FIG. 31 depicts an example of a smartphone screen shot of the Crash Details page screen 300 for the gathering of general and location details related to the incident/collision for the mobile application version of the System and Method for Law Enforcement Incident Reporting. This Crash Details page screen 300 is used by LE personnel to document the incident/collision by entering general information and location information related to the incident/collision. General information includes the assigned Incident number the date and time of the incident, and location information includes the address where the incident/collision occurred.

FIG. 32 depicts an example of a smartphone screen shot of the Crash Details page screen 310 for the gathering of location and weather details related to the incident/collision for the mobile application version of the System and Method for Law Enforcement Incident Reporting. This Crash Details page screen 310 is used by LE personnel to document the incident/collision by entering location information and weather conditions information related to the incident/collision. Location information includes the initial contact area and posted speed limit in miles per hour (MPH). Weather condition factors include what was the weather like, for example, clear, cloudy, raining, snowing, fog/visibility and other.

FIG. 33 depicts an example of a smartphone screen shot of the Crash Details page screen 320 for the gathering of lighting and roadway surface details related to the incident/collision for the mobile application version of the System and Method for Law Enforcement Incident Reporting. This Crash Details page screen 320 is used by LE personnel to document the incident/collision by entering lighting information and roadway surface information related to the incident/collision. Lighting information includes what were the lighting conditions at the time of the incident/collision, for example, daylight, dusk-dawn, dark—streetlights, dark—no streetlights, dark—streetlights not functioning.

FIG. 34 depicts an example of a smartphone screen shot of the Crash Details page screen 330 for the gathering of roadway conditions and traffic control devices details related to the incident/collision for the mobile application version of the System and Method for Law Enforcement Incident Reporting. This Crash Details page screen 330 is used by LE personnel to document the incident/collision by entering roadway conditions information and traffic control devices present information related to the incident/collision scene. Roadway conditions include what were the roadway conditions, for example, holes, deep rut, loose material on roadway, obstruction on the roadway, construction—repair zone, reduced roadway width, flooded, other and no unusual conditions. Traffic control devices information includes what as the condition of the traffic control devices, for example, controls functioning, controls not functioning, controls obscured, and no controls present/factor.

Figures 35, 36, 37, 38:
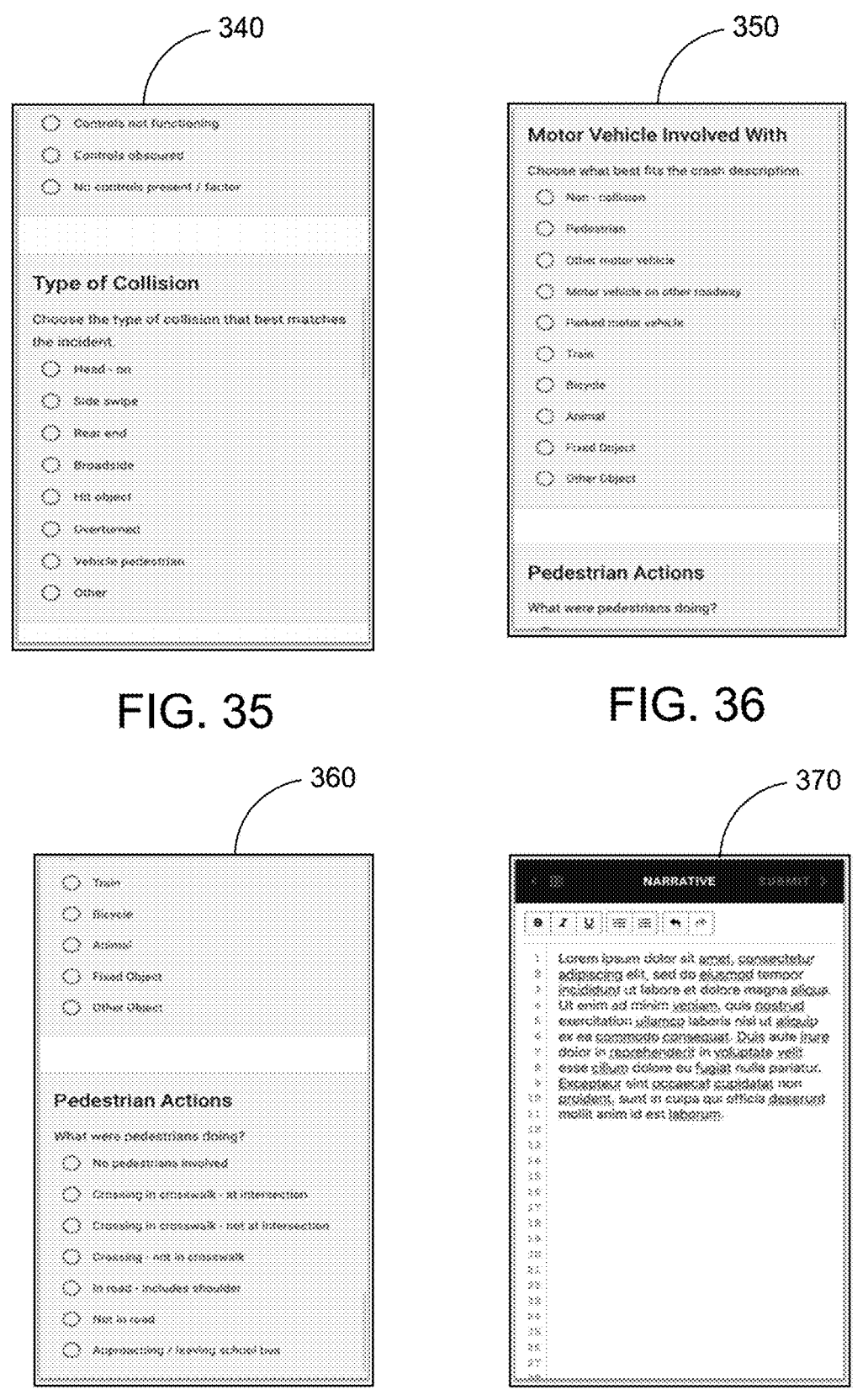

FIG. 35 depicts an example of a smartphone screen shot of the Crash Details page screen 340 for the gathering of traffic control devices type of collision details related to the incident/collision for the mobile application version of the System and Method for Law Enforcement Incident Reporting. This Crash Details page screen 340 is used by LE personnel to document the incident/collision by entering type of collision information related to the incident/collision. The reporting LE officer chooses the type of collision that best matches the incident, for example, head-on, side swipe, rear end, broadside, hit object, overturned, vehicle-pedestrian and other.

FIG. 36 depicts an example of a smartphone screen shot of the Crash Details page screen 350 for the gathering of motor vehicle involved with and pedestrian actions details related to the incident/collision for the mobile application version of the System and Method for Law Enforcement Incident Reporting. This Crash Details page screen 350 is used by LE personnel to document the incident/collision by entering motor vehicle involvement (involved with) information related to the incident/collision. The motor vehicle involvement is entered by choosing what best fits the crash description, for example, non-collision, pedestrian, other motor vehicle, motor vehicle note roadway, parked motor vehicle, train, bicycle, animal, fixed object, and other object.

FIG. 37 depicts an example of a smartphone screen shot of the Crash Details page screen 360 for the gathering of motor vehicle involved with and pedestrian actions details related to the incident/collision for the mobile application version of the System and Method for Law Enforcement Incident Reporting. This Crash Details page screen 360 is used by LE personnel to document the incident/collision by entering pedestrian actions information related to the incident/collision. The pedestrian actions information is entered by answering what pedestrians were doing at the scene of the incident/collision. For example, no pedestrians involved, crossing in crosswalk—at intersection, crossing in crosswalk—not at intersection, crossing not in crosswalk, in road—includes shoulder, not in road and approaching/leaving school bus.

FIG. 38 depicts an example of a smartphone screen shot of the Narrative page screen 370 for the documenting of the written narrative section of the incident/collision report generated from the data gathered by law enforcement officers at the scene of the incident/collision. This Narrative page screen 370 is used to report on incident/collision data relating to the report narrative generated from the incident/collision data being collected and documented on by law enforcement officers at the scene of the incident/collision. The Narrative page screen 370 enables LE personnel to create narrative, capture narrative through a narrative capture feature. Narratives are created using factors such as text input (typing), video recording input, audio recording input, text to speech input (voice recognition activated text typing) and witness testimony input. A user can type in text online numbered formatted screens or accepting text, change fonts, bod, highlight and otherwise word-process the narrative entered. The resulting incident/collision report narratives include, for example, a crash narrative and witness testimony.

Figure 39:
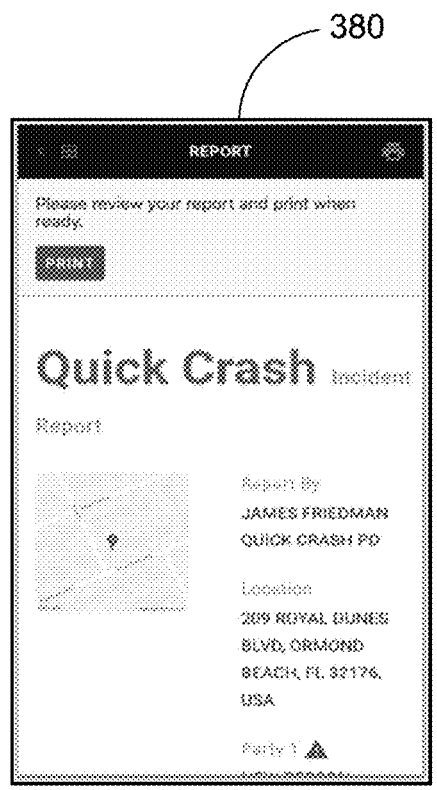
FIG. 39 depicts an example of a smartphone screen shot of the Report page for the generation of documented reports of the data and written narrative section of the incident/collision report as generated from the data gathered by law enforcement officers at the scene of the incident/collision.

FIG. 39 depicts an example of a smartphone screen shot of the Report page screen 380 for the generation of documented reports of the data and written narrative section of the incident/collision report as generated from the data gathered by law enforcement officers at the scene of the incident/collision. This Report page screen 380 can be used by LE personnel to review an existing report or print an existing report within the system. LE personnel can check the entire incident/collision report for completeness and validation. A completed validated report can then be printed, sent electronically/digitally or uploaded/downloaded and exported. It is also anticipated that completed validated reports will be uploaded to a cloud based law enforcement incident report database server system for further dissemination to governmental agencies, police departments, and he court system, as well as further dissemination to private parties, individuals, insurance companies, investigators and attorneys (see FIG. 1).

The System and Method for Law Enforcement Incident Reporting 10 shown in the drawings and described in detail herein disclose arrangements of elements of particular construction and configuration for illustrating preferred embodiments of structure and method of operation of the present application. It is to be understood, however, that elements of different construction and configuration and other arrangements thereof, other than those illustrated and described may be employed for providing the System and Method for Law Enforcement Incident Reporting 10 in accordance with the spirit of this disclosure, and such changes, alternations and modifications as would occur to those skilled in the art are considered to be within the scope of this design as broadly defined in the appended claims.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. For example, one portion of one of the embodiments described herein can be substituted for another portion in another embodiment described herein. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can." "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

Further, the purpose of the foregoing abstract is to enable the U.S. Patent and Trademark Office, foreign patent offices worldwide and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

We claim:

1. A system for law enforcement incident reporting, comprising:
   (a) a system log in page, a system home page and a system settings page, all of which are in wireless communication with a cloud based law enforcement incident report database server, wherein a user of the system can log in, be authenticated, and set settings related to future use of the system;
   (b) a plurality of law enforcement reporting system modules structured to accept entered data related to an incident in connection with generating an incident report, wherein the incident is a law enforcement incident, and wherein the data is entered via a data capture interface on a user device;
   (c) a system overview page structured to allow the user to navigate to said plurality of law enforcement reporting system modules structured to accept entered data related to an incident in connection with generating an incident report; and
   (d) system driver license information capture, system vehicle information capture and system media capture capabilities structured to accept entered driver license information, vehicle information and media files to the system;
   wherein at least one of the plurality of law enforcement reporting system modules is structured to:
      (1) generate and display, on the user device, the data capture interface;
      (2) generate and display, on the user device, at least one dynamic question comprising a data collection field relevant to a particular type of incident reporting;
      (3) capture, via the data capture interface, a response to the at least one dynamic question;
      (4) based on location data collected from the user device without manual user input, automatically detect a geographical location of the incident; and
      (5) populate the data capture interface with the captured response to the at least one dynamic question and the detected geographical location displayed via a map, the map comprising a control structured to add objects to the map; and
   wherein when entry of data required for the particular type of incident reporting is completed, the system generates an incident report narrative and facilitates submission of said incident report narrative.

2. The system for law enforcement incident reporting according to claim 1, wherein said cloud based law enforcement incident report database server facilitates transfer of system module entered incident data and captured incident information between one or more law enforcement officers on scene, government agencies and private parties.

3. The system for law enforcement incident reporting according to claim 1, wherein said plurality of law enforcement reporting system modules structured to accept entered data related to an incident in connection with generating an incident report includes a system module structured to accept entered people information regarding each person involved in the incident.

4. The system for law enforcement incident reporting according to claim 3, wherein said system module people information regarding each person involved in the incident includes driver license scanning and driver license information capture capabilities.

5. The system for law enforcement incident reporting according to claim 1, wherein said plurality of law enforcement reporting system modules structured to accept entered data related to an incident in connection with generating an incident report includes a system module structured to accept entered vehicle information regarding each vehicle involved in the incident.

6. The system for law enforcement incident reporting according to claim 5, wherein said system module structured to accept entered vehicle information regarding each vehicle involved in the incident includes vehicle license plate scanning and vehicle information capture capabilities.

7. The system for law enforcement incident reporting according to claim 1, wherein said plurality of law enforcement reporting system modules structured to accept entered data related to an incident in connection with generating an incident report includes a system module structured to accept entered crash diagram information for each incident.

8. The system for law enforcement incident reporting according to claim 1, wherein said plurality of law enforcement reporting system modules structured to accept entered data related to an incident in connection with generating an incident report includes a system module structured to accept entered party factor information regarding each party involved in the incident.

9. The system for law enforcement incident reporting according to claim 1, wherein said plurality of law enforcement reporting system modules structured to accept entered data related to an incident in connection with generating an incident report includes a system module structured to accept entered media information regarding each incident.

10. The system for law enforcement incident reporting according to claim 1, wherein said plurality of law enforcement reporting system modules structured to accept entered data related to an incident in connection with generating an incident report includes a module structured to accept entered crash details information regarding each incident.

11. A method of making a system for law enforcement incident reporting, comprising the steps of:
(a) providing a system log in page, a system home page and a system settings page, all of which are in wireless communication with a cloud-based law enforcement incident report database server, wherein a user of the system can log in, be authenticated, and set settings related to future use of the system;
(b) providing a plurality of law enforcement reporting system modules structured to accept entered data related to an incident in connection with generating an incident report, wherein the incident is a law enforcement incident, and wherein the data is entered via a data capture interface on a user device;
(c) providing a system overview page structured to allow the user to navigate to said plurality of law enforcement reporting system modules structured to accept entered data related to an incident in connection with generating an incident report; and
(d) providing system driver license information capture, system vehicle information capture and system media capture capabilities structured to accept entered driver license information, vehicle information and media files to the system;
wherein at least one of the plurality of law enforcement reporting system modules is structured to:
(1) generate and display, on the user device, the data capture interface;
(2) generate and display, on the user device, at least one dynamic question comprising a data collection field relevant to a particular type of incident reporting;
(3) capture, via the data capture interface, a response to the at least one dynamic question;
(4) based on location data collected from the user device without manual user input, automatically detect a geographical location of the incident; and
(5) populate the data capture interface with the captured response to the at least one dynamic question and the detected geographical location displayed via a map, the map comprising a control structured to add objects to the map; and
wherein when entry of data required for the particular type of incident reporting is completed, the system generates an incident report narrative and facilitates submission of said incident report narrative.

12. The method for making a system for law enforcement incident reporting according to claim 11, wherein said cloud based law enforcement incident report database server facilitates transfer of system module entered incident data and captured incident information between one or more law enforcement officers on scene, government agencies and private parties.

13. The method for making a system for law enforcement incident reporting according to claim 11, wherein said plurality of law enforcement reporting system modules structured to accept entered data related to an incident in connection with generating an incident report includes a system module structured to accept entered people information regarding each person involved in the incident.

14. The method for making a system for law enforcement incident reporting according to claim 13, wherein said system module structured to accept entered people information for each person involved in the incident includes driver license scanning and driver license information capture capabilities.

15. The method for making a system for law enforcement incident reporting according to claim 11, wherein said plurality of law enforcement reporting system modules structured to accept entered data related to an incident in connection with generating an incident report includes a system module structured to accept entered vehicle information regarding each vehicle involved in the incident.

16. The method for making a system for law enforcement incident reporting according to claim 15, wherein said system module structured to accept entered vehicle information for each vehicle involved in the incident includes vehicle license plate scanning and vehicle information capture capabilities.

17. The method for making a system for law enforcement incident reporting according to claim 11, wherein said plurality of law enforcement reporting system modules structured to accept entered data related to an incident in connection with generating an incident report includes a system module structured to accept entered crash diagram information regarding each incident.

18. The method for making a system for law enforcement incident reporting according to claim 11, wherein said plurality of law enforcement reporting system modules structured to accept entered data related to an incident in connection with generating an incident report includes a system module structured to accept entered party factor information regarding each party involved in the incident.

19. The method for making a system for law enforcement incident reporting according to claim 11, wherein said plurality of law enforcement reporting system modules structured to accept entered data related to an incident in connection with generating an incident report includes a system module structured to accept entered media information regarding each incident.

20. The method for making a system for law enforcement incident reporting according to claim 11, wherein said plurality of law enforcement reporting system modules structured to accept entered data related to an incident in connection with generating an incident report includes a module structured to accept entered crash details information regarding each incident.

21. A method of using a system for law enforcement incident reporting, comprising the steps of:

(a) logging in to a cloud based law enforcement incident report database server system by user authentication, and adjusting user system settings related to use of the system;

(b) starting a new incident report by navigating to a system overview page then navigating to a plurality of law enforcement system modules structured to accept entered data related to an incident in connection with generating an incident report, wherein the incident is a law enforcement incident, and wherein the data is entered via a data capture interface on a user device and at least one of the plurality of law enforcement reporting system modules is structured to:

(1) generate and display, on the user device, the data capture interface;

(2) generate and display, on the user device, at least one dynamic question comprising a data collection field relevant to a particular type of incident reporting;

(3) capture, via the data capture interface, a response to the at least one dynamic question; and (4) based on location data collected from the user device without manual user input, automatically detect a geographical location of the incident; and (5) populate the data capture interface with the captured response to the at least one dynamic question and the detected geographical location displayed via a map, the map comprising a control structured to add objects to the map;

(c) entering data into a plurality of law enforcement reporting system modules structured to accept entered data related to an incident in connection with generating an incident report;

(d) using system modules to capture driver license information, system vehicle information and system media, thereby adding the driver license information, the vehicle information and system media files to the system;

(e) using system modules to write an incident report narrative, check the report narrative for completeness, and validate the report; and (f) generating the incident report, comprising printing the incident report, electronic digital transfer of the incident report, and uploading the incident report to said cloud based law enforcement incident report database.

\* \* \* \* \*